(12) United States Patent
Ishido

(10) Patent No.: US 9,025,219 B2
(45) Date of Patent: May 5, 2015

(54) IMAGE READING DEVICE AND IMAGE FORMING DEVICE

(71) Applicant: KYOCERA Document Solutions Inc., Osaka (JP)

(72) Inventor: Kohei Ishido, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/042,961

(22) Filed: Oct. 1, 2013

(65) Prior Publication Data

US 2014/0092445 A1  Apr. 3, 2014

(30) Foreign Application Priority Data

Oct. 2, 2012 (JP) .................................. 2012-220520

(51) Int. Cl.
*H04N 1/04* (2006.01)
*H04N 1/00* (2006.01)

(52) U.S. Cl.
CPC ......... *H04N 1/00801* (2013.01); *H04N 1/0071* (2013.01); *H04N 1/00713* (2013.01); *H04N 1/00734* (2013.01); *H04N 1/00755* (2013.01)

(58) Field of Classification Search
CPC .............. H04N 1/00681; H04N 1/193; H04N 1/00748; H04N 1/00737; H04N 1/1017
USPC .......................... 358/488, 486, 497, 449, 451; 250/234–236; 399/211, 212
See application file for complete search history.

(56) References Cited

U.S. PATENT DOCUMENTS

2004/0169895 A1  9/2004  Hashizume et al.

FOREIGN PATENT DOCUMENTS

| JP | 60046572 A | * | 3/1985 |
|----|----|----|----|
| JP | 61-213707 | | 9/1986 |
| JP | 07-147631 | | 6/1995 |
| JP | 10-051598 | | 2/1998 |
| JP | 10-171218 | | 6/1998 |
| JP | 2005-134733 | | 5/2005 |
| JP | 2007-049315 | | 2/2007 |

* cited by examiner

*Primary Examiner* — Cheukfan Lee
(74) *Attorney, Agent, or Firm* — Wenderoth, Lind & Ponack, L.L.P.

(57) ABSTRACT

An image reading device includes a reading unit provided with an image sensor and configured to read a manuscript placed on a contact glass, a manuscript sensor whose output level varies depending on whether the manuscript is detected, and a moving mechanism configured to move the manuscript sensor from a predetermined reference position in an oblique direction with respect to a main scanning direction and a sub scanning direction such that a detection zone of the manuscript sensor passes through a side of the manuscript parallel to the sub scanning direction and a side of the manuscript parallel to the main scanning direction. A recognizing unit is also included that is configured to recognize lengths in the main scanning direction and the sub scanning direction of the manuscript, based on a displacement of the manuscript sensor from the reference position.

11 Claims, 19 Drawing Sheets

Fig.12

(OUTWARD ROUTE: FIRST REFERENCE POSITION~SECOND REFERENCE POSITION)

| CLOCK NUMBER OF STEPPING MOTOR | SENSOR OUTPUT LEVEL | |
|---|---|---|
| | Low→High<br>LENGTH IN VERTICAL (MAIN)<br>SCANNING DIRECTION<br>[ mm ] | High→Low<br>LENGTH IN HORIZONTAL (SUB)<br>SCANNING DIRECTION<br>[ mm ] |
| 0 | 288.20 | 0.00 |
| 60 | Y1 | X1 |
| 120 | Y2 | X2 |
| ⋮ | ⋮ | ⋮ |
| n1 | Yn1 | Xn1 |
| ⋮ | — | ⋮ |
| n2 | — | Xn2 |

Fig.15

(HOMEWARD ROUTE: SECOND REFERENCE POSITION~ FIRST REFERENCE POSITION)

| CLOCK NUMBER OF STEPPING MOTOR | SENSOR OUTPUT LEVEL | |
|---|---|---|
| | High→Low LENGTH IN VERTICAL (MAIN) SCANNING DIRECTION [mm] | Low→High LENGTH IN HORIZONTAL (SUB) SCANNING DIRECTION [mm] |
| 0 | 0.00 | 431.68 |
| 60 | Y3 | X3 |
| 120 | Y4 | X4 |
| ⋮ | ⋮ | ⋮ |
| n3 | Yn3 | Xn3 |
| ⋮ | ⋮ | — |
| n4 | Yn4 | — |

IMAGE READING DEVICE AND IMAGE FORMING DEVICE

CROSS-REFERENCE TO RELATED APPLICATION(S)

This application is based upon and claims the benefit of priority from Japanese Patent Application(s) No. 2012-220520 filed on Oct. 2, 2012, the entire contents of which are incorporated herein by reference.

BACKGROUND

The technology of the present disclosure relates to an image reading device which performs reading of a manuscript and an image forming device provided with the image reading device.

An image reading device obtains image data by guiding light emitted from a light source and reflected by a manuscript to an image sensor. The image reading device is often installed in an image forming device such as a multi-functional peripheral, a copier or a facsimile device. In order to output image data at a suitable size or to recognize a reading range on a manuscript, some image reading devices perform manuscript size detection. One example of the devices which perform the manuscript size detection will be described below.

One illustrative device includes a manuscript stand on which at least one side of a manuscript is paced according to a manuscript placing standard, a detection position set in a specified position deviated from the manuscript placing standard in order to detect a size of the manuscript, a detecting means for detecting the manuscript in the detection position, a size specifying means for specifying the size of the manuscript placed on the manuscript stand, based on a detection state of the manuscript in the detection position, and a moving means for moving the detecting means to a specified detection position. The size specifying means specifies the size of the manuscript placed on the manuscript stand, based on the detection state of the manuscript in the specified detection position detected by the moving detecting means. Paying attention to the fact that a lens means provided in case of performing image formation by enlarging or reducing an image of a manuscript is configured to move in X and Y directions below the manuscript stand, the image reading device may seek reduce the number of detection sensors and perform accurate detection of a manuscript size.

SUMMARY

An image reading device according to the present disclosure includes a contact glass, a reading unit, a manuscript sensor, a moving mechanism and a recognizing unit. A manuscript as a reading target is placed the contact glass. The reading unit is provided with an image sensor and is configured to read the manuscript placed on the contact glass. The output level of the manuscript sensor varies depending on whether the existence of the manuscript is detected or not. The moving mechanism is configured to move the manuscript sensor from a predetermined reference position in an oblique direction with respect to a main scanning direction and a sub scanning direction such that a detection zone of the manuscript sensor passes through a side of the manuscript placed on the contact glass, which is parallel to the sub scanning direction (e.g., a lower side of the manuscript when the back side of the image reading device is assumed to be upward) and a side of the manuscript parallel to the main scanning direction (e.g., a side distant from a manuscript placing reference point, namely a right side of the manuscript when the back side of the image reading device is assumed to be upward). The recognizing unit is configured to, when performing manuscript size detection, recognize a length in the main scanning direction of the manuscript placed on the contact glass and a length in the sub scanning direction of the manuscript placed on the contact glass, based on a displacement of the manuscript sensor from the reference position at the time when the output level of the manuscript sensor shows a change.

An image forming device according to the present disclosure includes the aforementioned image reading device.

BRIEF DESCRIPTION OF THE DRAWINGS

FIG. 12 is an explanatory view showing one example of the correspondence relationship between the number of clocks inputted to a motor and the lengths of a manuscript in the respective scanning directions.

FIG. 15 is an explanatory view showing one example of the correspondence relationship between the number of clocks inputted to a motor and the lengths of a manuscript in the respective scanning directions.

DETAILED DESCRIPTION

Embodiments of the present disclosure will now be described with reference to FIGS. 1 to 19. In the subject specification, embodiments will be described by taking as an example a multi-functional peripheral 100 (corresponding to an image forming device) which includes an image reading device 1. However, individual elements such as configurations and arrangements described in the respective embodiments are not intended to limit the technical scope of the present disclosure but are nothing more than mere explanation examples.

(Overview of Configuration of Multi-Functional Peripheral 100)

Figure 1:
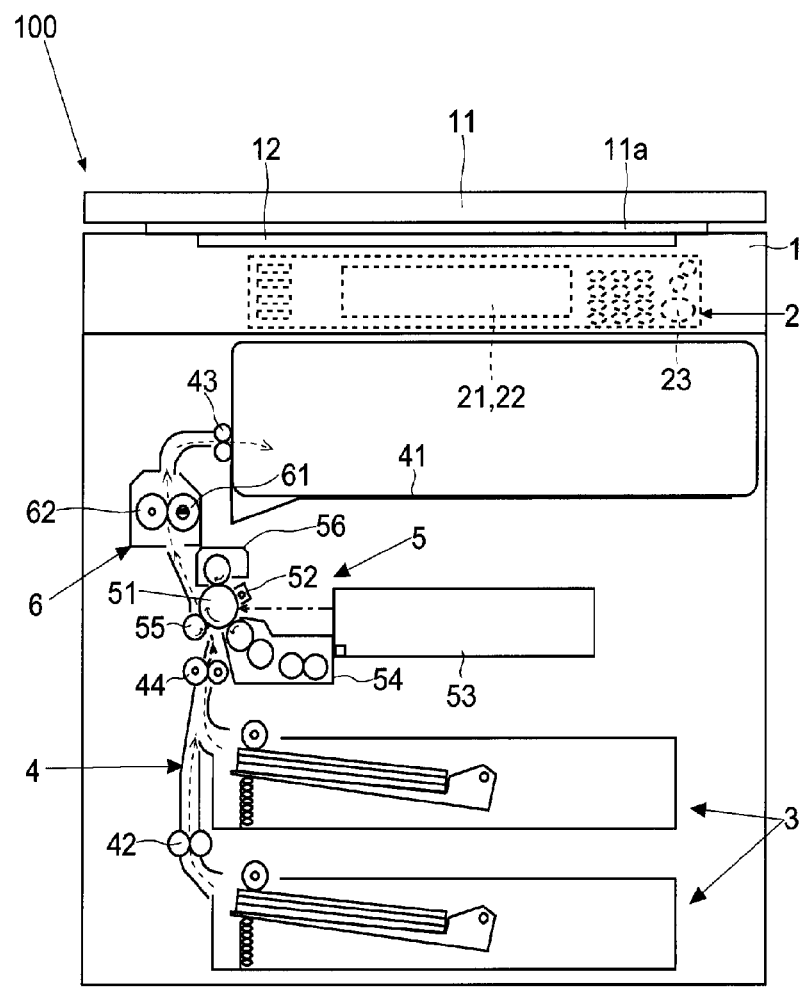
FIG. 1 is a schematic section view of a multi-functional peripheral.

Referring first to FIG. 1, description will be made on the overview of a multi-functional peripheral 100 including an image reading device 1 according to an embodiment. FIG. 1 is a schematic section view of the multi-functional peripheral 100.

As shown in FIG. 1, an image reading device 1 including a manuscript cover 11 is arranged in an upper portion of the multi-functional peripheral 100 of the present embodiment (the details of which will be described later). An operation panel 2 (indicated by dot lines and corresponding to an output setting unit) is installed on a front surface of the image reading device 1. A paper feeding unit 3, a conveying unit 4, an image forming unit 5, a fixing unit 6 and the like are installed within a main body of the multi-functional peripheral 100.

As illustrated in FIG. 1, the operation panel 2 is installed on an front upper surface of the multi-functional peripheral 100. The operation panel 2 includes a liquid crystal display unit 21 for displaying a status of the multi-functional peripheral 100 and different kinds of messages. The liquid crystal display unit 21 can display one or more keys for performing function selection, function setting, letter input, and so forth. A touch panel portion 22 (of, e.g., a resistor film type) is installed on an upper surface of the liquid crystal display unit 21. The touch panel portion 22 is used to extract the position and coordinates of a pushed region in the liquid crystal display unit 21. Different kinds of hard keys, including a start key 23 for instructing the start of execution of different functions such as copying and the like are installed in the operation panel 2. By performing an operation with respect to a setting screen displayed on the liquid crystal display unit 21 of the operation panel 2, it is possible to set a size of a paper used in a copying operation or an output size of image data obtained by a reading operation.

The paper feeding unit 3 receives a plurality of papers (e.g., copy papers, plain papers, recycled papers, thick papers, and different kinds of sheets such as OHP sheets and the like) and feeds the papers one by one. The conveyed unit 4 is a path for transferring the papers from the paper feeding unit 3 to a discharge tray 41. In the conveying unit 4, there are installed transfer roller pairs 42 and 43 which are rotationally driven during paper conveyance and a register roller pair 44 which causes the conveyed paper to wait in front of the image forming unit 5 and sends the paper in conformity with the toner image formation timing.

The image forming unit 5 forms a toner image based on image data and transfers the toner image to the conveyed paper. Thus, the image forming unit 5 includes a photoreceptor drum 51 supported so as to be rotationally driven in an arrow direction shown in FIG. 1, an electrifying device 52 arranged around the photoreceptor drum 51, an exposure device 53, a developing device 54, a transfer roller 55, a cleaning device 56, and so forth.

A toner image formation and transfer process will now be described. The photoreceptor drum 51 is installed substantially at the center of the image forming unit 5 and is rotationally driven in a specified direction. The electrifying device 52 electrifies the photoreceptor drum 51 at a specified electric potential. In FIG. 1, the exposure device 53 outputs laser light based on image data and scan-exposes the surface of the photoreceptor drum 51, thereby forming an electrostatic latent image corresponding to the image data. As the image data, use is made of image data obtained by the image reading device 1, image data transmitted from an external computer 200 connected via a network or the like, or image data transmitted from a counterpart facsimile device 300 (see FIG. 5).

The developing device 54 supplies toner to the electrostatic latent image formed on the photoreceptor drum 51, thereby developing the electrostatic latent image. The transfer roller 55 is pressed against the photoreceptor drum 51, thereby forming a nip. The paper enters the nip at the timing conforming to the toner image. When the paper enters the nip, a specified voltage is applied to the transfer roller 55. The toner image formed on the photoreceptor drum 51 is transferred to the paper. The cleaning device 56 removes the toner which remains on the photoreceptor drum 51 after the transfer of the toner image.

The fixing unit 6 fixes the toner image transferred to the paper. In the present embodiment, the fixing unit 6 is mainly formed of a heating roller 61 having a built-in heating body and a pressing roller 62. The heating roller 61 and the pressing roller 62 are pressed against each other, thus forming a nip. The paper passes through the nip, whereby the toner existing on the surface of the paper is melted and heated. Thus, the toner image is fixed to the paper. The toner-fixed paper (the printed paper) is discharged to the discharge tray 41. In this manner, image formation (printing) is performed during the course of using a copy function or a printer function.

(Hardware Configuration of Multi-Functional Peripheral 100)

Figure 2:
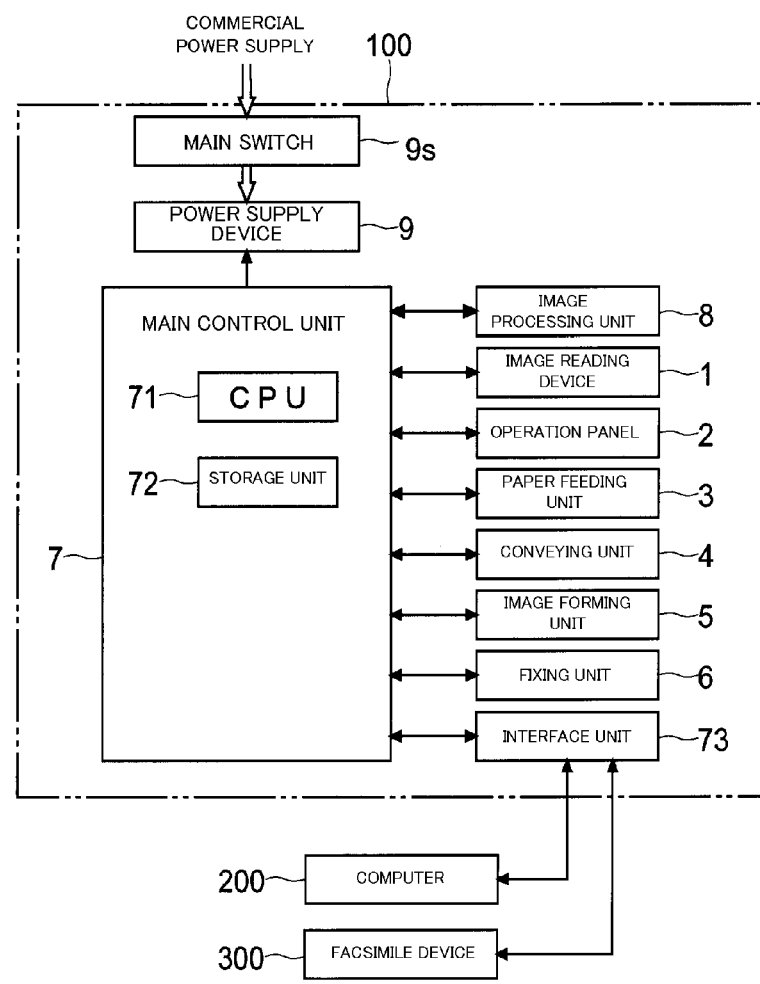
FIG. 2 is a block diagram showing one example of a hardware configuration of the multi-functional peripheral.

Referring next to FIG. 2, description will be made on a hardware configuration of the multi-functional peripheral 100 according to an embodiment. FIG. 2 is a block diagram showing one example of the hardware configuration of the multi-functional peripheral 100.

As shown in FIG. 2, the multi-functional peripheral 100 according to the present embodiment includes a main control unit 7 arranged therein. The main control unit 7 governs the control of the multi-functional peripheral 100 as a whole. For example, the main control unit 7 includes a CPU 71 and a storage unit 72.

The CPU 71, a central arithmetic processing device, performs control of the respective units of the multi-functional peripheral 100 and carries out calculation using a control program stored in the storage unit 72 and developed from the storage unit 72. The storage unit 72 is formed of a memory device such as a ROM, a RAM, a HDD, a flash ROM, or the like. The storage unit 72 stores a program for the control of the multi-functional peripheral 100, control data, setting data, image data obtained by reading a manuscript with the image reading device 1, and so forth.

The main control unit 7 is connected to: the image reading device 1; the paper feeding unit 3, the conveying unit 4, the image forming unit 5 and the fixing unit 6 arranged within the multi-functional peripheral 100; the operation panel 2; and the like. Based on the control program and data of the storage unit 72, the main control unit 7 controls operations of the respective units so that the image formation can be appropriately carried out.

The main control unit 7 is connected to an interface unit 73 which includes different kinds of connectors, a socket, a communication control chip, and so forth. The interface unit 73 connects a computer 200 (e.g., a personal computer or a server) or a counterpart facsimile device 300 to the multi-functional peripheral 100 via a network, a cable or a public line so that they can make communication with each other. For example, the interface unit 73 can transmit image data including setting data to the external computer 200 or the counterpart facsimile device 300 (or an Internet facsimile) (a scanner function and a facsimile function). Moreover, the interface unit 73 can store the image data received from the external computer 200 or the counterpart facsimile device 300 in the storage unit 72 and can print the image data (a printer function and a facsimile function).

(Overview of Image Reading Device 1)

Figure 3:
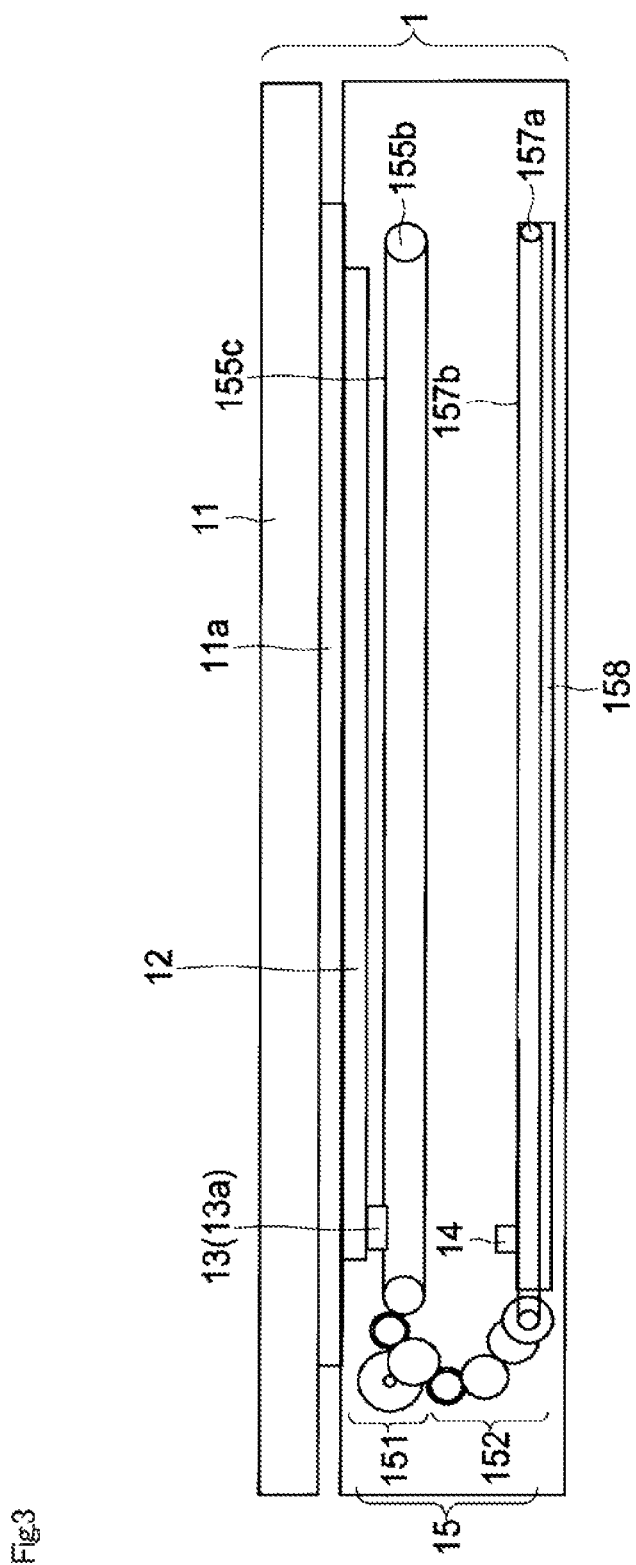
FIG. 3 is a schematic section view showing one example of an image reading device.
Figure 4:
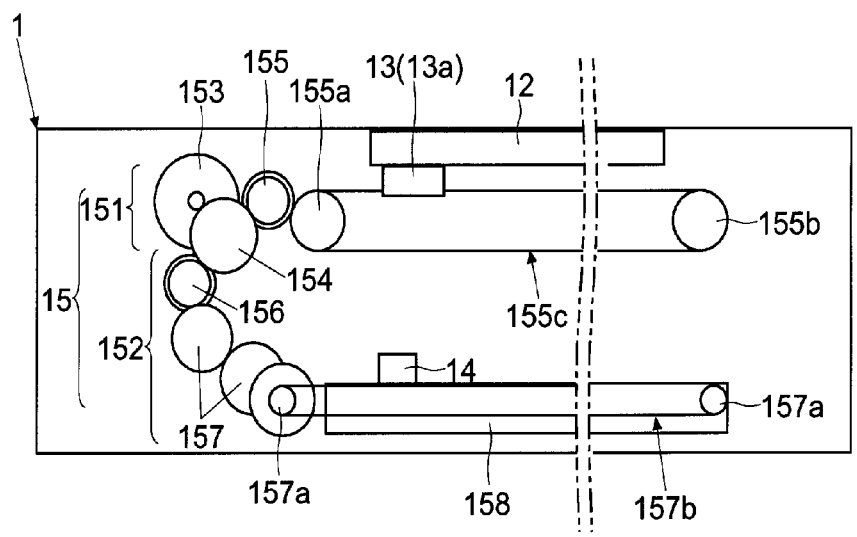
FIG. 4 is an enlarged section view showing a moving mechanism part on an enlarged scale.
Figure 5:
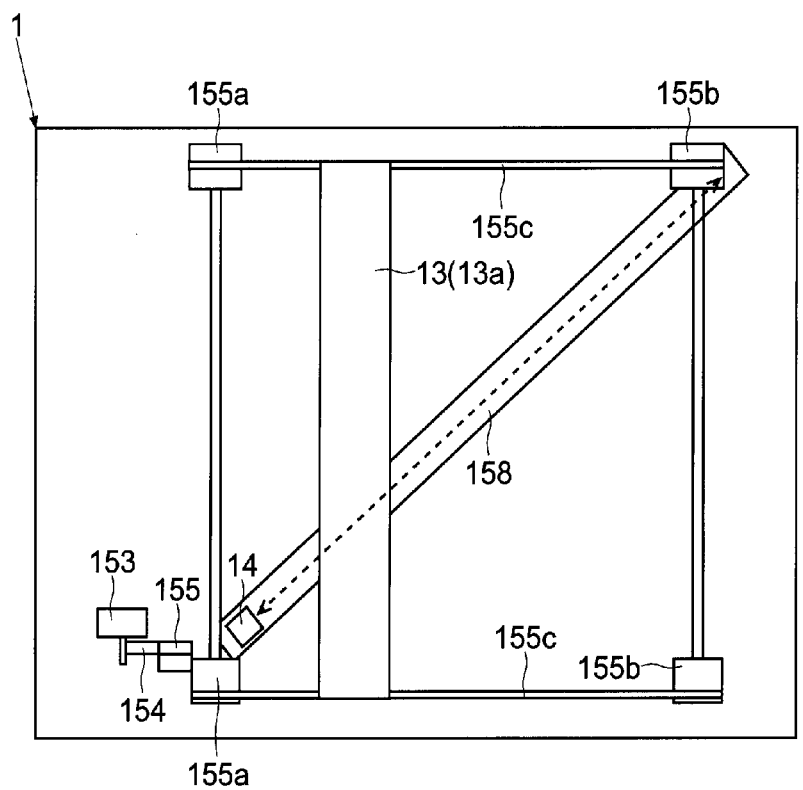
FIG. 5 is a top view showing one example of a part for moving a reading unit and a manuscript sensor.
Figure 6:
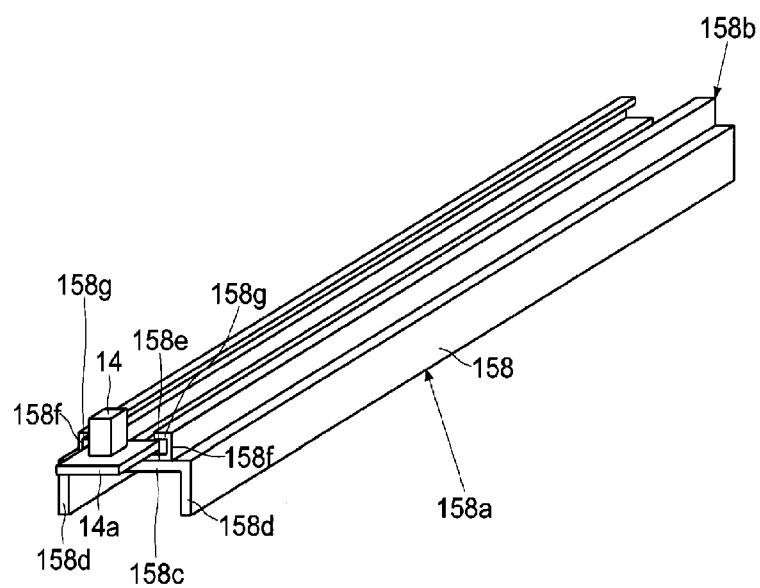
FIG. 6 is a perspective view showing one example of a guide member for guiding a manuscript sensor.

Referring next to FIGS. 3 to 6, description will be made on the image reading device 1 according to an embodiment. FIG. 3 is a schematic section view showing one example of the image reading device 1. FIG. 4 is an enlarged section view showing the part of a moving mechanism 15 on an enlarged scale. FIG. 5 is a top view showing one example of a part for moving a reading unit 13 and a manuscript sensor 14. FIG. 6 is a perspective view showing one example of a guide member 158 for guiding the manuscript sensor 14.

The image reading device 1 of the present embodiment is included in the multi-functional peripheral 100. Thus, FIG. 3 shows, on an enlarged scale, only the manuscript cover 11 and the image reading device 1 extracted from the multi-functional peripheral 100. The manuscript cover 11 can be opened and closed by swinging the front end portion thereof existing at the front surface side of the image reading device 1 (the multi-functional peripheral 100) about a hinge portion 11b (see FIG. 9) installed at the back side in a direction perpendicular to the drawing sheet plane in FIG. 3. A white manuscript pressing plate 11a, which is pressed so as to cover the region of a contact glass 12 when the manuscript cover 11 is closed, is installed on the lower surface of the manuscript cover 11. A user opens the manuscript cover 11 and puts a manuscript on the contact glass 12. Thereafter, the user closes the manuscript cover 11 and presses the manuscript with the manuscript cover 11 (the manuscript pressing plate 11a).

The image reading device 1 includes a transparent flat contact glass 12 arranged on the upper surface thereof. The image reading device 1 irradiates light on the manuscript placed on the contact glass 12 and reads the manuscript using the reflected light, thereby generating image data.

In order to perform reading of the manuscript, the image reading device 1 includes a reading unit 13 provided with an image sensor 13a of CIS (Contact Image Sensor) type. The reading unit 13 is installed below the contact glass 12. The reading unit 13 includes a housing having a substantially U-like cross-sectional shape. A flat glass is attached to the housing so as to cover an upper surface opening of the housing. The image sensor 13a extending in a direction perpendicular to the drawing sheet plane (in a main scanning direction) is installed within the reading unit 13. The image sensor 13a is a line sensor in which a plurality of photoelectric conversion elements 13c (light receiving elements) is arranged along the main scanning direction (see FIG. 19). In the reading unit 13 of the present embodiment, the image sensor 13a is longer than the side of an A3 size paper parallel to the main scanning direction so that the image sensor 13a can read the A3 size paper. The image sensor 13a can perform the black-and-white reading and the color reading (The image sensor 13a includes a plurality of line sensors).

Within the reading unit 13, there are installed a lamp 13b (e.g., an LED lamp or a cold cathode tube) (see FIG. 7) for irradiating light on a manuscript and a lens (e.g., a rod lens array) for guiding the light reflected from the manuscript to the image sensor 13a. While an example in which the reading unit 13 includes the image sensor 13a of CIS type is described in the image reading device 1 of the present embodiment, it may be possible to use a reading unit of a reduction optical system within which a lamp, a lens, a mirror and a CCD image sensor are formed into a unit.

The respective photoelectric conversion elements 13c (light receiving elements) arranged along the main scanning direction of the image sensor 13a output a voltage (current) in response to one line reading. Image data for one line is generated by the photoelectric conversion elements 13c (light receiving elements). Reading is performed line by line along a sub scanning direction, whereby one page of a manuscript is read.

A manuscript sensor 14 is installed below the image sensor 13a. The manuscript sensor 14 is a sensor whose output level varies depending on whether a manuscript exists above the manuscript sensor 14 or not. For example, a reflection-type photo sensor is used as the manuscript sensor 14.

As shown in FIG. 5, the reading unit 13 (the image sensor 13a) is moved in the sub scanning direction. In the image reading device 1 of the present embodiment, as illustrated in FIG. 5, the reading unit 13 moves from the left side of the contact glass 12 toward the right side thereof when reading a manuscript. The manuscript sensor 14 is moved in an oblique direction with respect to the main scanning direction and the sub scanning direction. More specifically, the manuscript sensor 14 is moved from the left front side of the image reading device 1 (the multi-functional peripheral 100) toward the right rear side thereof.

In order to move the reading unit 13 and the manuscript sensor 14, a moving mechanism 15 is installed within the image reading device 1. A reading unit moving mechanism 151 of the moving mechanism 15, which moves the reading unit 13 (the image sensor 13a), will now be described with reference to FIGS. 4 and 5.

As shown in FIG. 4, a motor 153 is installed as a drive source for moving the image sensor 13a. The motor 153 can rotate in forward and reverse directions. For example, a stepping motor is used as the motor 153. A drive force transmitting gear 154 is connected to a rotating shaft of the motor 153. A first electromagnetic clutch 155 (corresponding to a first clutch) is connected to the drive force transmitting gear 154. The transmission and interruption of a drive force generated from the motor 153 can be switched by an ON/OFF operation of the first electromagnetic clutch 155. Thus, during rotation of the motor 153, the reading unit 13 (the image sensor 13a) may be moved or may not be moved.

A first roller 155a is connected to the first electromagnetic clutch 155. The first roller 155a, which has an axis extending in the main scanning direction, is installed in a more leftward (outward) position than a left end position of the contact glass 12. A second roller 155b, which has an axis parallel to the axis of the first roller 155a, is installed more rightward than the right end of the contact glass 12. Two belts 155c are wound around the first roller 155a and the second roller 155b. The reading unit 13 (the image sensor 13a) is attached to the belts 155c.

The first roller 155a is rotated by rotating the motor 153 and converting the first electromagnetic clutch 155 into a connected state. Responsive to the rotation of the first roller 155a, the respective belts 155c move around the first roller 155a and the second roller 155b. The second roller 155b is driven by the belts 155c. Thus, the reading unit 13 (the image sensor 13a) can be moved in the sub scanning direction between the left and right ends of the contact glass 12. By changing the rotation direction of the motor 153, the reading unit 13 can be moved from the right side toward the left side or from the left side toward the right side.

Next, a manuscript sensor moving mechanism 152 of the moving mechanism 15, which moves the manuscript sensor 14, will be described with reference to FIGS. 4 and 5.

As shown in FIG. 4, the motor 153 is used as a drive source for moving the manuscript sensor 14 as well as the image sensor 13a. In other words, the motor 153 alone is used as a drive source for driving the image sensor 13a and the manuscript sensor 14. The manuscript sensor moving mechanism 152 includes a second electromagnetic clutch 156 (corresponding to a second clutch), a second gear group 157, a pair of pulleys 157a, a second belt 157b, a guide member 158, and so forth.

The second electromagnetic clutch 156 is connected to the drive force transmitting gear 154 connected to the rotating shaft of the motor 153. The transmission and interruption of a drive force of the motor 153 can be switched by an ON/OFF operation of the second electromagnetic clutch 156. Thus, during rotation of the motor 153, the manuscript sensor 14 may be moved or may not be moved.

The second gear group 157 is connected to the second electromagnetic clutch 156. For example, the second gear group 157 is a combination of bevel gears and is a gear group for changing a rotation axis direction from a direction parallel to the main scanning direction to an oblique direction in conformity with the moving direction of the manuscript sensor 14. The drive force is transmitted from the second gear group 157 to one of the pulleys 157a. The second belt 157b is wound around the two pulleys 157a. The manuscript sensor 14 is connected to the second belt 157b through a manuscript sensor mounting plate 14a which will be described later.

As shown in FIGS. 4 and 6, the guide member 158 for guiding the movement of the manuscript sensor 14 is installed in a lower area within the image reading device 1 (below the reading unit 13). In the image reading device 1 of the present embodiment, the manuscript sensor 14 is installed on a flat manuscript sensor mounting plate 14a. As shown in FIG. 5, the guide member 158 is obliquely arranged with respect to the main scanning direction and the sub scanning direction. As illustrated in FIG. 6, the guide member 158 is a member obtained by combining a downwardly-opened mounting base 158a having a substantially inverted U-like cross section and an upwardly-opened guide rail 158b having a substantially C-like cross section. More specifically, the mounting base 158a includes a horizontally-arranged flat upper wall 158c and two flat sidewalls 158d extending downward from the horizontal opposite ends of the upper wall 158c. The guide rail 158b includes a horizontally-arranged flat lower wall 158e, two flat sidewalls 158f extending upward from the horizontal opposite ends of the lower wall 158e, and two upper walls 158g horizontally extending from the upper ends of the respective sidewalls 158f. As depicted in FIG. 6, the manuscript sensor mounting plate 14a is fitted into the guide rail 158b. The second belt 157b is passed below the guide rail 158b and the mounting base 158a.

The respective pulleys 157a are rotated by rotating the motor 153 and converting the second electromagnetic clutch 156 into a connected state. Responsive to the rotation of the pulleys 157a, the second belt 157b moves around the pulleys 157a. Thus, the manuscript sensor 14 can be moved between the left and right ends of the contact glass 12 (between one end portion and the other end portion of the guide member 158). In other words, the manuscript sensor 14 can be moved in an oblique direction with respect to the main scanning direction and the sub scanning direction. By changing the rotation direction of the motor 153, the manuscript sensor 14 can be moved from the oblique left lower side toward the oblique right upper side or from the oblique right upper side toward the oblique left lower side.

In the present embodiment, description is made on an example in which, when the back side of the image reading device 1 is assumed to be upward with the front side thereof assumed to be downward, the guide member 158 is installed to extend from the oblique left lower side to the oblique right upper side and in which the manuscript sensor 14 is moved between the oblique left lower side and the oblique right upper side. Alternatively, when the back side of the image reading device 1 is assumed to be upward with the front side thereof assumed to be downward, the guide member 158 may be obliquely arranged with respect to the main scanning direction and the sub scanning direction by installing the guide member 158 to extend from the oblique left upper side to the oblique right lower side so that the manuscript sensor 14 can be moved between the oblique left upper side and the oblique right lower side.

(Hardware Configuration of Image Reading Device 1 and Generation of Image Data)

Figure 7:
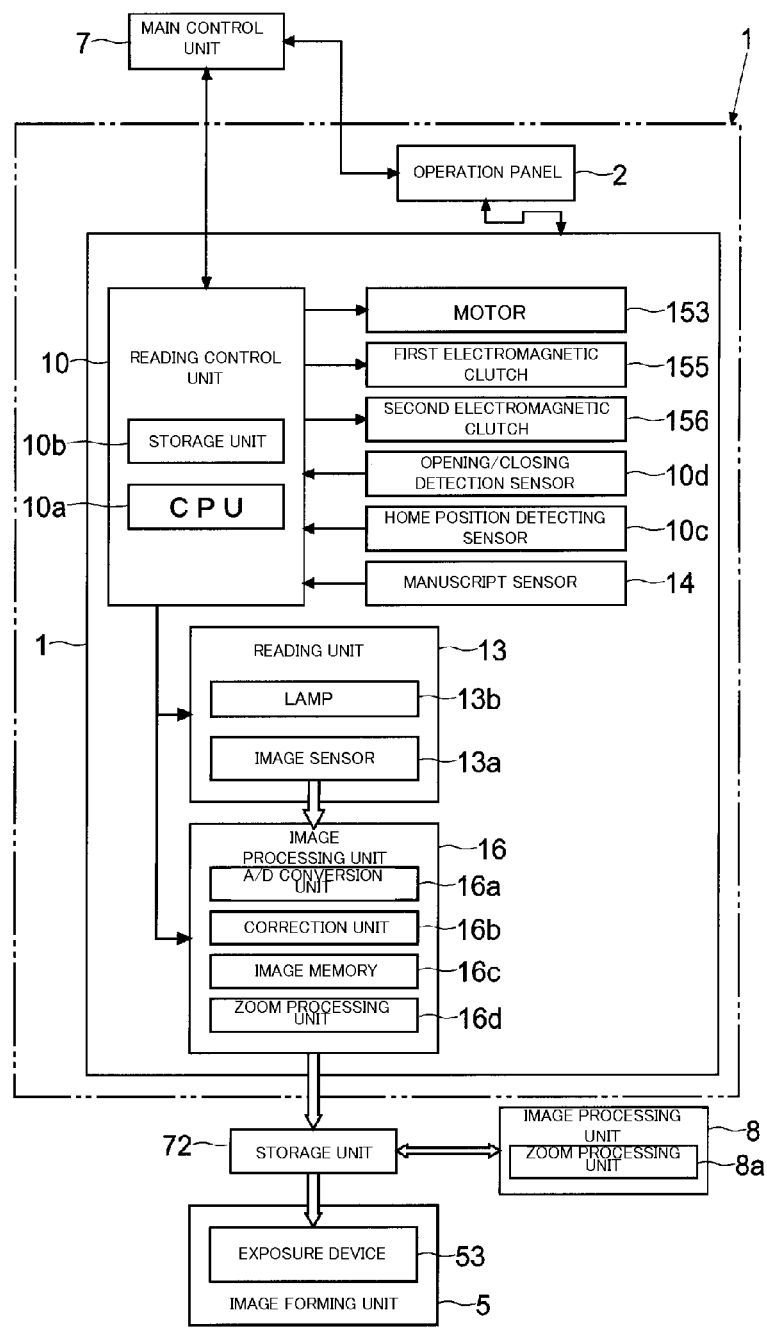
FIG. 7 is a block diagram showing one example of an image reading device.

Referring next to FIG. 7, description will be made on the hardware configuration of the image reading device 1 according to an embodiment and the flow of image data. FIG. 7 is a block diagram showing one example of the image reading device 1. In FIG. 7, the flow of image data is indicated by white arrows.

A reading control unit 10 (corresponding to a recognizing unit) is installed in the image reading device 1. The reading control unit 10 is a substrate on which various kinds of electronic parts such as a CPU 10a and a chip are mounted. For example, a storage unit 10b is installed within the reading control unit 10. For example, the storage unit 10b stores a program for the control of the image reading device 1 and data. The reading control unit 10 is connected to the main control unit 7 of the main body of the multi-functional peripheral 100 so that the reading control unit 10 can make communication with the main control unit 7. If the reading of a manuscript is performed by, e.g., pushing a start key 23 of the operation panel 2, the main control unit 7 sent a manuscript reading instruction to the reading control unit 10. The reading control unit 10 receives the instruction of the main control unit 7 and performs the control of the image reading device 1.

For example, when performing manuscript size detection (the details of which will be described later) and manuscript reading, the reading control unit 10 rotates the motor 153 at a predetermined speed. Prior to starting the manuscript reading, the reading control unit 10 converts the second electromagnetic clutch 156 into a connected state and moves the manuscript sensor 14 in order to perform the manuscript size detection. After performing the manuscript size detection, the reading control unit 10 converts the first electromagnetic clutch 155 into a connected state and moves the reading unit 13, thus causing the reading unit 13 to perform the manuscript reading.

Within the image reading device 1, there is installed a home position detecting sensor 10c for detecting that the reading unit 13 (the image sensor 13a) stays in a home position. For example, the home position is set to lie below the contact glass 12 and more leftward than the left end of the contact glass 12 so that reading can be performed from the left end of the contact glass 12. Then, the reading unit 13 is moved to the right side of the contact glass 12 to perform the manuscript reading. Thereafter, the reading control unit 10 rotates the motor 153 in the reverse direction, thereby returning the reading unit 13 to the home position.

The home position detecting sensor 10c is a sensor whose output level is changed depending on whether the existence of the reading unit 13 is detected or not. For example, the home position detecting sensor 10c is a reflection-type photo sensor. The output of the home position detecting sensor 10c is inputted to the reading control unit 10. The reading control unit 10 checks the output of the home position detecting sensor 10c and recognizes the return of the reading unit 13 to the home position.

During the manuscript reading, the reading control unit 10 controls the reading unit 13. During the manuscript reading, the reading control unit 10 lights up lamps 13b included in the reading unit 13. Furthermore, the reading control unit 10 operates the image sensor 13a included in the reading unit 13. Analog data outputted from the respective photoelectric conversion elements 13c (the light receiving elements) of the image sensor 13a are inputted to an image processing unit 16.

An A/D conversion unit 16a, a correction unit 16b, an image memory 16c, and the like can be installed in the image processing unit 16 arranged within the image reading device 1. The A/D conversion unit 16a converts the analog output (analog output voltage) of the respective photoelectric conversion elements 13c of the image sensor 13a to a digital value. The correction unit 16b performs various kinds of correction such as shading correction and γ correction with respect to the image data, thereby correcting the distortions which depend on the positions of the respective light receiving elements, such as the unevenness of light quantity distributions of the respective lamps 13b and the individual difference of the respective photoelectric conversion elements 13c.

The image data processed by the correction unit 16b are stored in the image memory 16c. For example, the image memory 16c outputs image data to the storage unit 72 (e.g., the RAM) of the main body on a manuscript page basis or on a basis of oblong blocks obtained by dividing a manuscript page (on a band unit).

The image data stored in the storage unit 72 are inputted to the image processing unit 8 of the main body. The image processing unit 8 of the present embodiment is a circuit formed by combining a work RAM as a calculation or work region relating to the image data and an ASIC as a dedicated circuit. Moreover, the image processing unit 8 can be realized in a software manner by storing an image processing program in the CPU 71 or the storage unit 72 of the main control unit 7.

The image processing unit 8 can perform various kinds of image processing, such as concentration conversion processing, scaling processing, conversion processing of data types (file types) of the image data, and so forth. However, there are many different kinds of feasible image processing. Since the image processing unit 8 is capable of performing the well-known image processing, the detailed description on the image processing which can be performed by the image processing unit 8 will be omitted in the subject specification.

For example, the image data subjected to the image processing in the image processing unit 8 are sent to the exposure device 53 of the image forming unit 5 and are used in the scan and exposure of the photoreceptor drum 51. This makes it possible to perform printing based on a manuscript (a copy function). Moreover, for example, the image data subjected to the image processing in the image processing unit 8 may be sent to, and stored in, the storage unit 72 (a scanner function). Alternatively, the image data subjected to the image processing in the image processing unit 8 may be transmitted to the external computer 200 or the facsimile device 300 via the interface unit 73 (a transmission function).

(Overview of Manuscript Size Detection)

Figure 8:
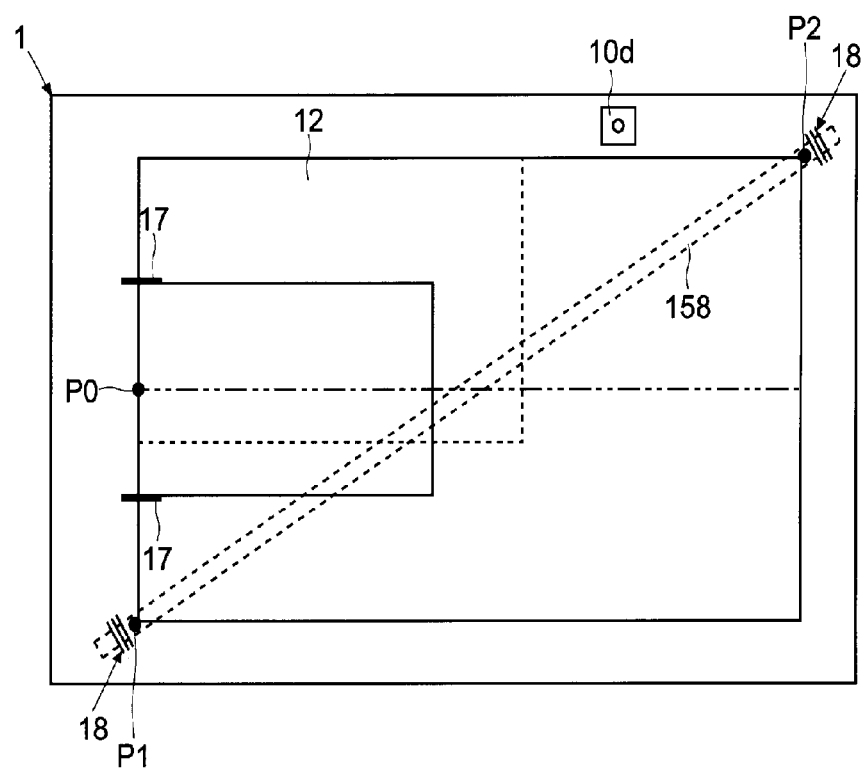
FIG. 8 is a view explaining how to detect a manuscript size.
Figure 9:
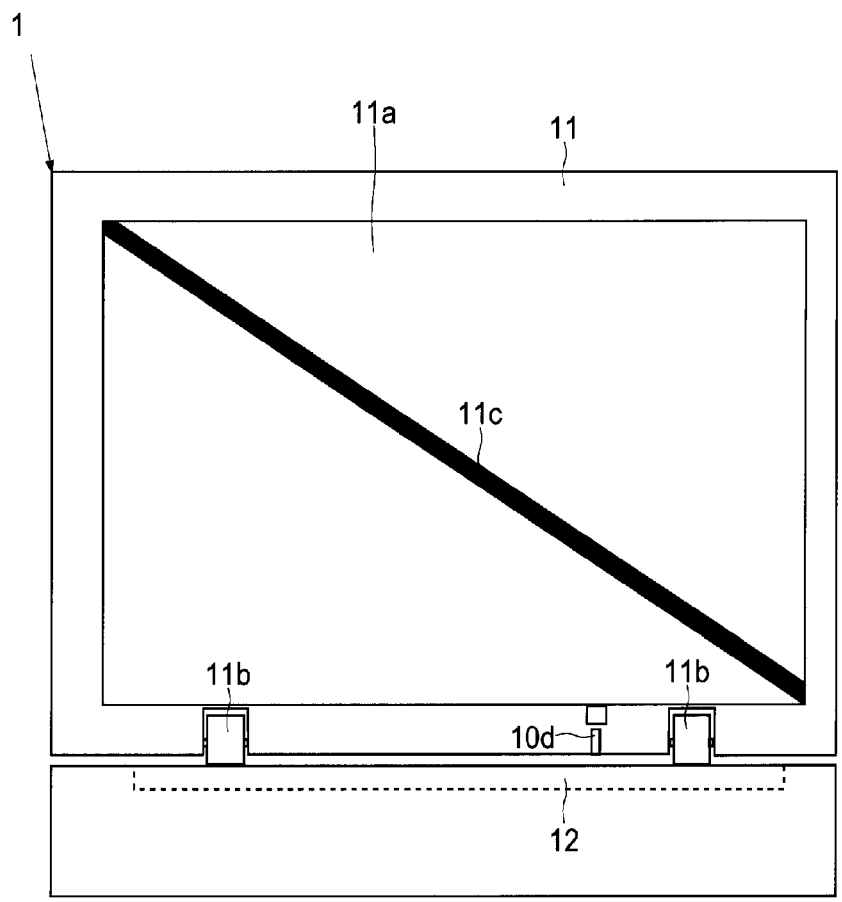
FIG. 9 is a front view showing one example of a state in which a manuscript cover of an image reading device is opened.

Referring next to FIGS. 8 and 9, description will be made on the overview of a manuscript size detection process performed by the image reading device 1 of the present embodiment. FIG. 8 is a view explaining how to detect a manuscript size. The manuscript cover 11 and the reading unit 13 are not shown in FIG. 8. FIG. 9 is a front view showing one example of a state in which the manuscript cover 11 of the image reading device 1 is opened.

Referring first to FIG. 8, there is installed the contact glass 12 on which a manuscript as a reading target is placed. As set forth above, the reading unit 13 (see FIGS. 3 and 4) (not shown in FIG. 8 for the sake of convenience) arranged below the contact glass 12 reads a manuscript (of, e.g., rectangular shape) placed on the contact glass 12.

In the image reading device 1 of the present embodiment, there is provided a reference point P0 at which a manuscript is placed on the contact glass 12. The reference point P0 is positioned at the center of the contact glass 12 in the main scanning direction and at the left end of the contact glass 12 in the sub scanning direction (In FIG. 8, the centerline of the contact glass 12 in the main scanning direction is indicated by a two-dot chain line). As shown in FIG. 8, a user places a manuscript on the contact glass 12 by aligning the left end of the manuscript (the left edge of the manuscript in the sub scanning direction) with the left end position of the contact glass 12 and aligning the center of the manuscript in the main scanning direction with the reference point P0. In order to assure easy alignment of the center of the manuscript in the main scanning direction with the reference point P0, marks indicating the upper and lower positions of a regular size paper may be added to the image reading device 1 (For example, the marks may be added to the left side of the contact glass 12). Alternatively, it may be possible to install guide members 17 that align the center of a manuscript in the main scanning direction with the reference point P0 by putting the manuscript between the guide members 17 in the up-down direction in FIG. 8 (in the main scanning direction), sliding the manuscript in the main scanning direction about the reference point P0 and gripping the manuscript (One example is shown in FIG. 8). In the present embodiment, description will be made on an example in which the reference point P0 is set at the center of the contact glass 12 in the main scanning direction.

However, the reference point P0 may be set at the left upper corner of the contact glass 12 (One example of manuscript placing in this example is indicated by a dot line in FIG. 8). In this case, a user places a manuscript on the contact glass 12 by aligning the left upper corner of the manuscript with the left upper corner of the contact glass 12. In order the make sure that the manuscript sensor 14 can reliably pass through the side of the manuscript parallel to the sub scanning direction (the long side of the manuscript in FIG. 8) and the side of the manuscript parallel to the main scanning direction (the short side of the manuscript in FIG. 8), it is preferred that the reference point P0 be set at the center of the contact glass 12 in the main scanning direction.

As described above, the manuscript sensor 14 whose output level varies depending on whether the existence of a manuscript is detected or not and the manuscript sensor moving mechanism 152 for moving the manuscript sensor 14 in an oblique direction with respect to the main scanning direction and the sub scanning direction, are installed below the reading unit 13 (see FIGS. 3 and 4) (not shown in FIG. 8 for the sake of convenience).

As shown in FIG. 8, the manuscript sensor moving mechanism 152 moves the manuscript sensor 14 along a line joining the left lower corner and the right upper corner of the contact glass 12. The angle and direction of the movement of the manuscript sensor 14 with respect to the main scanning direction and the sub scanning direction are not limited to the aforementioned example. For example, the manuscript sensor 14 may be moved along a line joining the left upper corner and the right lower corner of the contact glass 12. It is not always necessary to move the manuscript sensor 14 along a line joining two corners of the contact glass 12. For example, the manuscript sensor 14 may be moved along a line joining a point spaced upward by an arbitrary distance from the left lower corner and a point spaced downward by an arbitrary distance from the right upper lower corner. In other words, it is only necessary that the manuscript sensor moving mechanism 152 moves the manuscript sensor 14 in an oblique direction with respect to the main scanning direction and the sub scanning direction so that the detection zone of the manuscript sensor 14 can pass through a border (borderline) between the side of the manuscript placed on the contact glass 12, which is parallel to the sub scanning direction, (the long side of the manuscript in FIG. 8) and the side of the manuscript parallel to the main scanning direction (the short side of the manuscript in FIG. 8) and the contact glass 12.

In moving the manuscript sensor 14, two reference positions (a first reference position P1 and a second reference position P2) are set (The reference positions are indicated by black spots in FIG. 8). When performing the manuscript size detection, the manuscript sensor 14 starts to move from one of the reference positions.

For example, the first reference position P1 is set at a location where the detection zone of the manuscript sensor 14 covers the left end (left lower corner) of the contact glass 12. The first reference position P1 may be located more leftward than the left end of the contact glass 12 (outward of the contact glass 12).

As an example, the second reference position P2 is set at a location where the detection zone of the manuscript sensor 14 covers the right end (right upper corner) of the contact glass 12. The second reference position P2 may be located more rightward than the right end of the contact glass 12 (outward of the contact glass 12).

Terminus portions 18 are installed in the end sections of the movement range of the manuscript sensor 14. The terminus portions 18 are formed such that, if the moving manuscript sensor 14 reads the terminus portions 18, the output waveform of the manuscript sensor 14 becomes a specific pattern. In FIG. 8, there is illustrated an example in which, as the terminus portions 18, three slits (openings) are formed so as to extend across the moving route of the manuscript sensor 14. If the manuscript sensor 14 reads the terminus portions 18 shown in FIG. 8, the output level of the manuscript sensor 14 is switched at a regular interval and the output waveform of the manuscript sensor 14 becomes a specific pattern.

It is only necessary that the terminus portions 18 are formed such that, if the moving manuscript sensor 14 reads the terminus portions 18, the output waveform of the manuscript sensor 14 becomes a specific pattern (the manuscript sensor 14 can recognize its arrival at the terminus of the moving range). The terminus portions 18 may not be slits. For example, the terminus portions 18 may be members attached at a regular interval so as to irregularly reflect the light irradiated by the manuscript sensor 14, linear black seals attached at a regular interval, or lines drawn by black paint and arranged at a regular interval.

As shown in FIG. 7, the output of the manuscript sensor 14 is inputted to the reading control unit 10. Thus, the reading control unit 10 recognizes the output level of the manuscript sensor 14. The reading control unit 10 recognizes that an output waveform having a specific pattern is outputted from the moving manuscript sensor 14 and further recognizes that the manuscript sensor 14 arrives at the terminus of the moving range. By stopping the motor 153 or converting the second electromagnetic clutch 156 into a released state, the reading control unit 10 keeps the moving mechanism 15 from moving the manuscript sensor 14 toward the terminus of the moving range.

The reference positions are set more inward than the terminus portions 18 by a predetermined distance. More specifically, the first reference position P1 is set more inward than the left end of the moving range of the manuscript sensor 14 by a predetermined distance. The second reference position P2 is set more inward than the right end of the moving range of the manuscript sensor 14 by a predetermined distance.

Upon recognizing that an output waveform having a specific pattern is outputted from the manuscript sensor 14, the reading control unit 10 causes the moving mechanism 15 to reverse the moving direction of the manuscript sensor 14 and to stop the manuscript sensor 14 in the nearest reference position (the first reference position P1 or the second reference position P2).

Next, description will be made on the manuscript size detection process of the present embodiment. In the manuscript sensor 14 of the present embodiment, the output level thereof varies depending on whether the existence of a manuscript (paper) is detected or not. For example, when the existence of a manuscript is detected (when a manuscript exists above the manuscript sensor 14), the manuscript sensor 14 of the present embodiment outputs a high level. On the other hand, when the existence of a manuscript is not detected (when a manuscript does not exist above the manuscript sensor 14), the manuscript sensor 14 of the present embodiment outputs a low level. The logic of high and low may be reversed.

Then, the manuscript sensor 14 of the present embodiment begins to move. As shown in FIG. 8, the position where the output level of the manuscript sensor 14 is switched is the position of the side (edge) of a manuscript. Thus, the reading control unit 10 can recognize the length in the main scanning direction and the length in the sub scanning direction of the manuscript placed on the contact glass 12, based on the displacement of the manuscript sensor 14 from the reference positions at the moment when the output level of the manuscript sensor 14 is changed. In this manner, the manuscript sensor 14 can accurately detect the lengths of a manuscript in the main scanning direction and in the sub scanning direction by merely making one way movement without having to reciprocate along the moving range.

More specifically, the terminus portions 18 are installed at the opposite ends of the moving range of the manuscript sensor 14. The first reference position P1 and the second reference position P2 as the reference positions are set more inward than the respective terminus portions 18 by a predetermined distance. When performing the manuscript size detection in a state in which the manuscript sensor 14 stays in the first reference position P1, the moving mechanism 15 moves the manuscript sensor 14 toward the second reference position P2. The reading control unit 10 recognizes the manuscript length in the main scanning direction and the manuscript length in the sub scanning direction, based on the displacement of the manuscript sensor 14 from the first reference position P1 at the moment when the output level of the manuscript sensor 14 is changed. Thereafter, the moving mechanism 15 stops the manuscript sensor 14 in the second reference position P2. When performing the manuscript size detection in a state in which the manuscript sensor 14 stays in the second reference position P2, the moving mechanism 15 moves the manuscript sensor 14 toward the first reference position P1. The reading control unit 10 recognizes the manuscript length in the main scanning direction and the manuscript length in the sub scanning direction, based on the displacement of the manuscript sensor 14 from the second reference position P2 at the moment when the output level of the manuscript sensor 14 is changed. Thereafter, the moving mechanism 15 stops the manuscript sensor 14 in the first reference position P1.

In the present embodiment, as described above, the manuscript sensor 14 is moved and the manuscript size detection is performed based on the change of the output level of the manuscript sensor 14. However, since the manuscript sensor 14 is a reflection-type photo sensor and the manuscript pressing plate 11a is white, it is sometimes the case that, when the manuscript sensor 14 is moved with the manuscript cover 11 kept closed, the output level of the manuscript sensor 14 is not clearly switched in the position of the side (edge) of the manuscript.

As shown in FIG. 9, in the manuscript pressing plate 11a, a reflection suppressing portion 11c for suppressing the reflection of light toward the manuscript sensor 14 is arranged in a position which corresponds to the moving track of the detection zone of the manuscript sensor 14 when the manuscript is pressed by the manuscript pressing plate 11a. More specifically, the reflection suppressing portion 11c of the present embodiment is a groove. In other words, a grove is formed on the manuscript pressing plate 11a of the present embodiment. The reflection suppressing portion 11c is not limited to the groove but may be a seal or paint having a color other than white (e.g., a black color). It is only necessary that the detection (reading) of the edge of the manuscript is manifested as the change of the output level of the manuscript sensor 14.

(Manuscript Size Detection when the Manuscript Sensor 14 is Moved from the First Reference Position P1 Toward the Second Reference Position P2)

Figure 10:
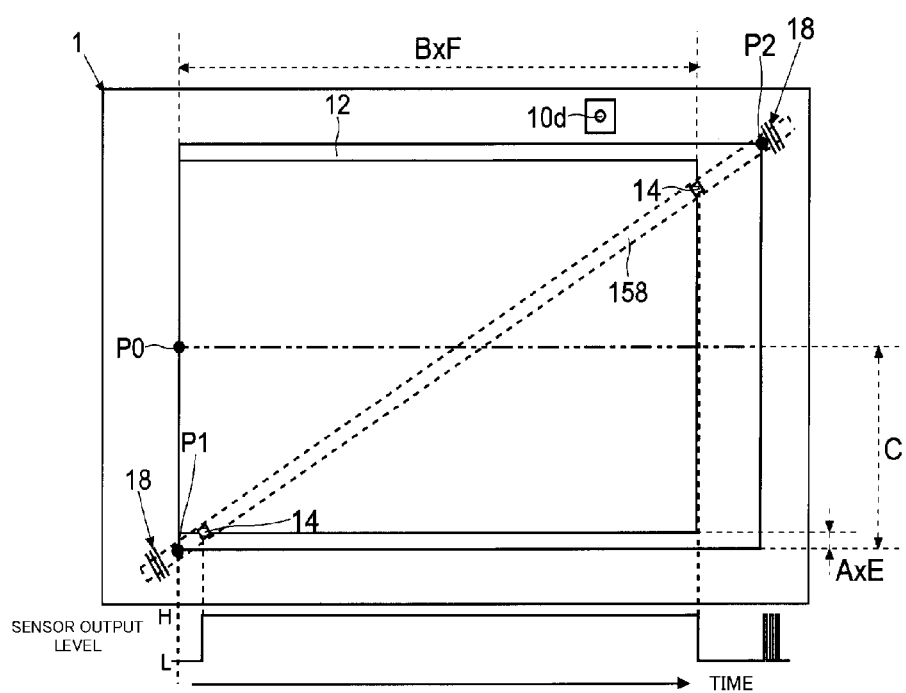
FIG. 10 shows one example of a state in which a manuscript having a ledger size is placed on a contact glass.
Figure 11:
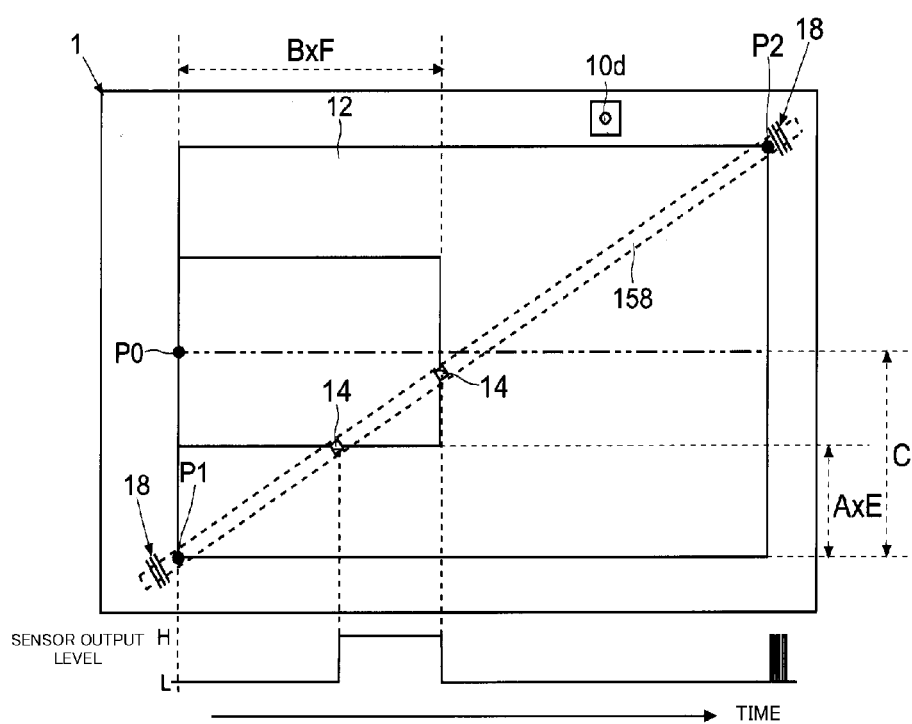
FIG. 11 shows one example of a state in which a manuscript having a statement size is placed on a contact glass.

Next, a manuscript size detection process when the manuscript sensor 14 is moved from the first reference position P1 toward the second reference position P2 will be described with reference to FIGS. 10 to 12. FIG. 10 shows one example of a state in which a manuscript having a ledger size is placed on the contact glass 12. FIG. 11 shows one example of a state in which a manuscript having a statement size is placed on the contact glass 12. FIG. 12 is an explanatory view showing one example of the correspondence relationship between the number of clocks inputted to the motor 153 and the lengths of a manuscript in the respective scanning directions.

In the manuscript sensor 14 of the present embodiment, the output level thereof becomes a high level when the existence of a manuscript is detected, and becomes a low level when the existence of a manuscript is not detected. Thus, as shown in FIGS. 10 and 11, if the manuscript sensor 14 is moved from the first reference position P1 toward the second reference position P2, the output level of the manuscript sensor 14 is changed from Low to High (Detection of the lower side of a manuscript) and then to Low (detection of the right side of a manuscript).

As shown in FIGS. 10 and 11, a manuscript having a statement size (5.5 inch×8.5 inch) is smaller than a manuscript having a ledger size (17 inch×11 inch). Therefore, the time taken from the start of movement to the output of a high level becomes longer. The time taken from the output of a high level to the falling to a low level becomes shorter. In this manner, the time point at which the output level of the manuscript sensor 14 shows a change is changed depending on the size of a manuscript.

The motor 153 of the present embodiment is a stepping motor. The reading control unit 10 rotates the motor 153 by inputting clock signals to the motor 153. The rotation angle (rotation amount) of the motor 153 per clock signal is decided according to specifications. Thus, the displacement per clock signal of the manuscript sensor 14 in the main scanning direction and the displacement per clock signal of the manuscript sensor 14 in the sub scanning direction are decided in advance.

Thus, the reading control unit 10 can find the position of the side (edge) of a manuscript with respect to the first reference position P1, based on the number of clocks inputted to the motor 153 between the time at which the manuscript sensor 14 begins to move from the first reference position P1 and the time at which the output level of the manuscript sensor 14 shows a change. By finding the position of the side (edge) of a manuscript, the reading control unit 10 can find the manuscript length in the main scanning direction and the manuscript length in the sub scanning direction. In other words, the count value (accumulated value) of the number of clocks counted from the start of movement to the change of the output level of the manuscript sensor 14 is a value that indicates the displacement of the manuscript sensor 14 from the first reference position P1.

The moving distance per clock of the manuscript sensor 14 in the main scanning direction is assumed to be A mm. The moving distance per clock of the manuscript sensor 14 in the sub scanning direction is assumed to be B mm. The distance from the detection position of the manuscript sensor 14 at the left edge of the contact glass 12 to the reference point P0 is assumed to be C mm. The distance in the main scanning direction from the first reference position P1 to the left end of the contact glass 12 is assumed to be D1 mm. The distance in the sub scanning direction from the first reference position P1 to the left end of the contact glass 12 is assumed to be D2 mm (As in the present embodiment, if the first reference position P1 is decided such that the left corner of the contact glass 12 coincides with the detection zone of the manuscript sensor 14, D1=D2=0). The number of clocks inputted to motor 153 between the time at which the manuscript sensor 14 begins to move from the first reference position P1 and the time at which the manuscript sensor 14 detects the side of a manuscript parallel to the sub scanning direction (the time at which the output level is changed from a low level to a high level) is assumed to be E. The number of clocks inputted to motor 153 between the time at which the manuscript sensor 14 begins to move from the first reference position P1 and the time at which the manuscript sensor 14 detects the side (right side) of a manuscript parallel to the main scanning direction (the time at which the output level is changed from a high level to a low level) is assumed to be F.

Then, the length of a manuscript in the main scanning direction can be found as follows.

$$\text{Length in the main scanning direction}=2\times(C-((A\times E)-D1))$$

In the above equation, only the E is a variable. Therefore, the manuscript length in the main scanning direction is found as a linear function. The manuscript length in the main scanning direction corresponds to the number of clocks inputted to motor 153 between the time at which the manuscript sensor 14 begins to move from the first reference position P1 and the time at which the output level is changed from a low level to a high level. The manuscript length in the main scanning direction is linearly changed.

Similarly, the length of a manuscript in the sub scanning direction can be found as follows.

$$\text{Length in the sub scanning direction}=(B\times F)-D2$$

In the above equation, only the F is a variable. Therefore, the manuscript length in the sub scanning direction is found as a linear function with respect to the number of clocks. The manuscript length in the sub scanning direction corresponds to the number of clocks inputted to motor 153 between the time at which the manuscript sensor 14 begins to move from the first reference position P1 and the time at which the output level of the manuscript sensor 14 is changed from a high level to a low level. The manuscript length in the sub scanning direction is linearly changed.

When the manuscript sensor 14 is moved from the first reference position P1 toward the second reference position P2, the count value of the number of clocks inputted to the motor 153 between the time at which the manuscript sensor 14 begins to move from the first reference position P1 and the time at which the output level of the manuscript sensor 14 shows a change, comes into a one-to-one correspondence relationship with the manuscript length in the main scanning direction and the manuscript length in the sub scanning direction. As shown in FIG. 12, with respect to the outward route from the first reference position P1 toward the second reference position P2, a table is prepared in advance which indicates the correspondence relationship of the manuscript length in the main scanning direction and the manuscript length in the sub scanning direction with the number of clocks inputted to the motor 153 between the time at which the manuscript sensor 14 starts movement and the time at which the output level of the manuscript sensor 14 shows a change. Using the table, the reading control unit 10 can easily and rapidly find the manuscript length in the main scanning direction and the manuscript length in the sub scanning direction. For example, the table may be stored in the storage unit 10b.

(Manuscript Size Detection when the Manuscript Sensor 14 is Moved from the Second Reference Position P2 Toward the First Reference Position P1)

Figure 13:
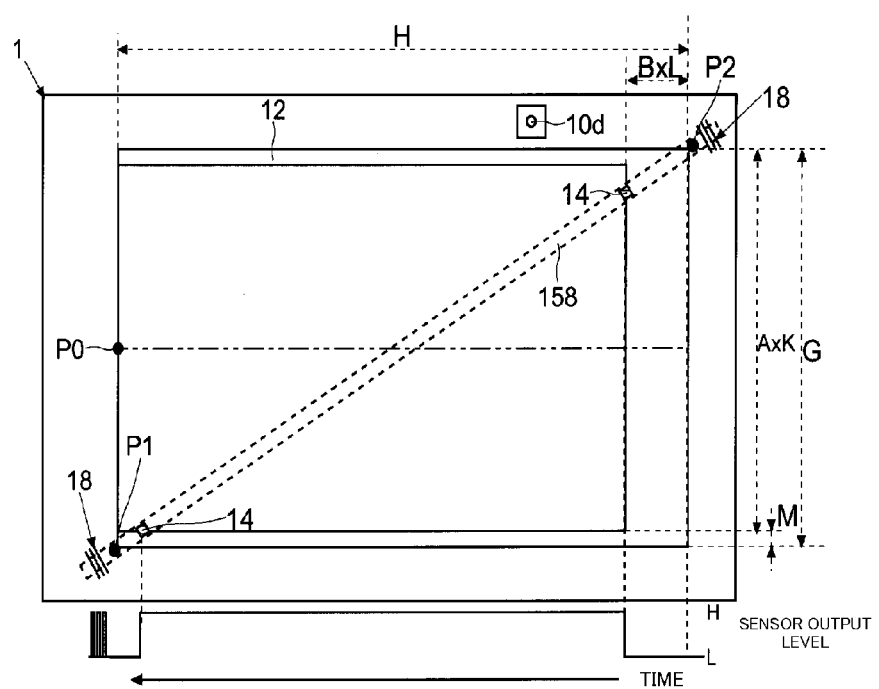
FIG. 13 shows one example of a state in which a manuscript having a ledger size is placed on a contact glass.
Figure 14:
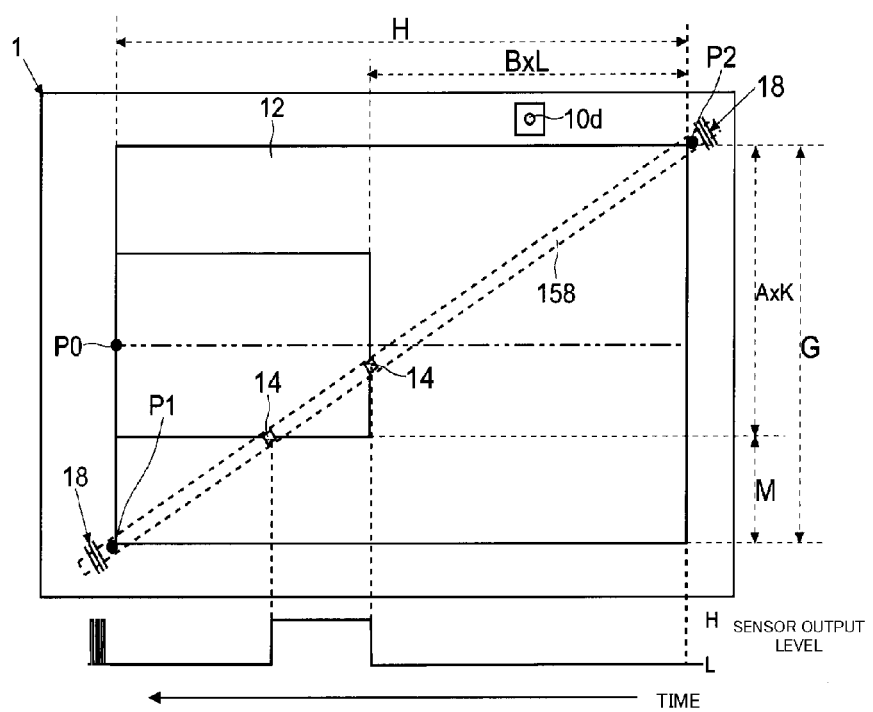
FIG. 14 shows one example of a state in which a manuscript having a statement size is placed on a contact glass.

Next, a manuscript size detection process when the manuscript sensor 14 is moved from the second reference position P2 toward the first reference position P1 will be described with reference to FIGS. 13 to 15. FIG. 13 shows one example of a state in which a manuscript having a ledger size is placed on the contact glass 12. FIG. 14 shows one example of a state in which a manuscript having a statement size is placed on the contact glass 12. FIG. 15 is an explanatory view showing one example of the correspondence relationship between the number of clocks inputted to the motor 153 and the lengths of a manuscript in the respective scanning directions.

As shown in FIGS. 13 and 14, if the manuscript sensor 14 is moved from the second reference position P2 toward the first reference position P1, the output level of the manuscript sensor 14 is changed from Low to High (Detection of the right side of a manuscript) and then to Low (detection of the lower side of a manuscript).

As illustrated in FIGS. 13 and 14, a manuscript having a statement size (5.5 inch×8.5 inch) is smaller than a manuscript having a ledger size (17 inch×11 inch). Therefore, the time taken from the start of movement to the output of a high level becomes longer. The time taken from the output of a high level to the falling to a low level becomes shorter. In this manner, even when the manuscript sensor 14 is moved from the second reference position P2 toward the first reference position P1, the time point at which the output level of the manuscript sensor 14 shows a change is changed depending on the size of a manuscript.

As set forth above, the motor 153 of the present embodiment is a stepping motor. The rotation angle (rotation amount) of the motor 153 per clock signal is decided according to specifications. Thus, the displacement per clock signal of the manuscript sensor 14 in the main scanning direction and the displacement per clock signal of the manuscript sensor 14 in the sub scanning direction are decided in advance.

Thus, the reading control unit 10 can find the position (distance) of the side (edge) of a manuscript with respect to the second reference position P2, based on the number of clocks inputted to the motor 153 between the time at which the manuscript sensor 14 begins to move from the second reference position P2 and the time at which the output level of the manuscript sensor 14 shows a change. Then, the reading control unit 10 can find the manuscript length in the main scanning direction and the manuscript length in the sub scanning direction. In other words, the count value (accumulated value) of the number of clocks counted from the start of movement to the change of the output level of the manuscript sensor 14 is a value that indicates the displacement of the manuscript sensor 14 from the second reference position P2.

The moving distance per clock of the manuscript sensor 14 in the main scanning direction is assumed to be A mm. The moving distance per clock of the manuscript sensor 14 in the sub scanning direction is assumed to be B mm. The length of the contact glass 12 in the main scanning direction is assumed to be G mm. The length of the contact glass 12 in the sub scanning direction is assumed to be H mm. The distance in the main scanning direction from the second reference position P2 to the right end of the contact glass 12 is assumed to be J1 mm. The distance in the sub scanning direction from the second reference position P2 to the right end of the contact glass 12 is assumed to be J2 mm (As in the present embodiment, if the second reference position P2 is decided such that the right corner of the contact glass 12 coincides with the detection zone of the manuscript sensor 14, J1=J2=0). The number of clocks inputted to motor 153 between the time at which the manuscript sensor 14 begins to move from the second reference position P2 and the time at which the manuscript sensor 14 detects the side of a manuscript parallel to the sub scanning direction (the time at which the output level is changed from a high level to a low level) is assumed to be K. The number of clocks inputted to motor 153 between the time at which the manuscript sensor 14 begins to move from the second reference position P2 and the time at which the manuscript sensor 14 detects the side (right side) of a manuscript parallel to the main scanning direction (the time at which the output level is changed from a low level to a high level) is assumed to be L. The length from the lower side (edge) of a manuscript to the lower end of the contact glass 12 is assumed to be M mm.

Then, the length of a manuscript in the main scanning direction can be found as follows.

$$M = G - ((A \times K) - J1))$$

Manuscript length in the main scanning direction=$G-2M$

In the above equation, only the K is a variable. Therefore, the manuscript length in the main scanning direction is found as a linear function with respect to the number of clocks. The manuscript length in the main scanning direction corresponds to the number of clocks inputted to motor 153 between the time at which the manuscript sensor 14 begins to move from the second reference position P2 and the time at which the output level is changed from a high level to a low level. The manuscript length in the main scanning direction is linearly changed.

Similarly, the length of a manuscript in the sub scanning direction can be found as follows.

Length in the sub scanning direction=$H-((B \times L) - J2)$

In the above equation, only the L is a variable. Therefore, the manuscript length in the sub scanning direction is found as a linear function with respect to the number of clocks. The manuscript length in the sub scanning direction corresponds to the number of clocks inputted to motor 153 between the time at which the manuscript sensor 14 begins to move from the second reference position P2 and the time at which the output level of the manuscript sensor 14 is changed from a high level to a low level. The manuscript length in the sub scanning direction is linearly changed.

Even when the manuscript sensor 14 is moved from the second reference position P2 toward the first reference position P1, the count value of the number of clocks inputted to the motor 153 from the time at which the manuscript sensor 14 begins to move from the second reference position P2 comes into a one-to-one correspondence relationship with the manuscript length in the main scanning direction and the manuscript length in the sub scanning direction. As shown in FIG. 15, with respect to the homeward route from the second reference position P2 toward the first reference position P1, a table is prepared in advance which indicates the correspondence relationship of the manuscript length in the main scanning direction and the manuscript length in the sub scanning direction with the number of clocks (the count number) inputted to the motor 153 between the time at which the manuscript sensor 14 starts movement and the time at which the output level of the manuscript sensor 14 shows a change. Using the table, the reading control unit 10 can easily and rapidly find the manuscript length in the main scanning direction and the manuscript length in the sub scanning direction. For example, the table may be stored in the storage unit 10b.

(Control During the Activation of Main Power)

Figure 16:
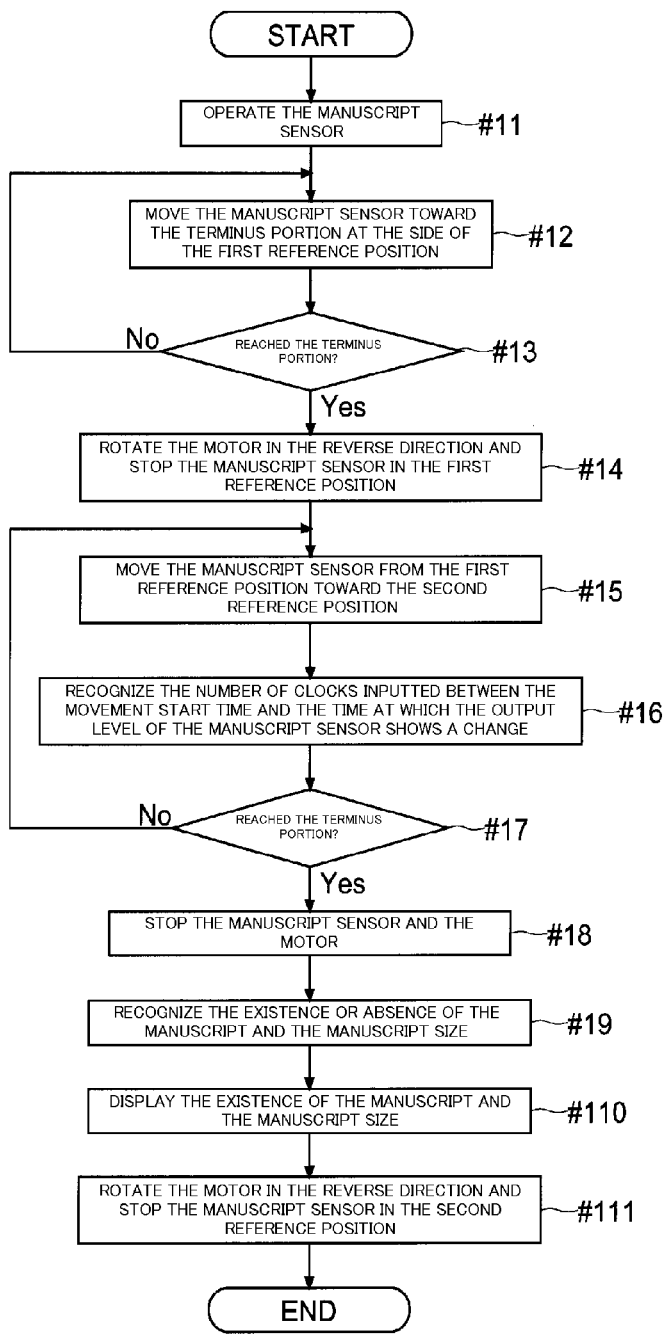
FIG. 16 is a flowchart showing one example of the position control of a manuscript sensor in an image reading device during the activation of main power.

Next, one example of the position control of the manuscript sensor 14 in the image reading device 1 during the activation of main power will be described with reference to FIGS. 2 and 16. FIG. 16 is a flowchart showing one example of the position control of the manuscript sensor 14 in the image reading device 1 during the activation of main power.

As shown in FIG. 2, a power supply device 9 is installed in the multi-functional peripheral 100 of the present embodiment. The power supply device 9 is supplied with electric power from a commercial power supply. The power supply device 9 includes a rectifying circuit, a voltage step-up circuit, a voltage step-down circuit, a smoothing circuit, and so forth. The power supply device 9 performs power conversion. The power supply device 9 generates a voltage necessary to operate the multi-functional peripheral 100 and the image reading device 1. For example, the power supply device 9 generates a voltage of DC 24V necessary to rotate electric motors (the motor 153 and the like) installed in the multi-functional peripheral 100 and the image reading device 1 and a voltage of DC 5V, 3.3V, 2.5V and 1.8V necessary to operate substrates, elements and circuits arranged within the multi-functional peripheral 100 and the image reading device 1. The image reading device 1 and the multi-functional peripheral 100 are operated by the electric power supplied from the power supply device 9.

As shown in FIG. 2, a main switch 9s for performing the supply and cutoff of main power is installed in the multi-functional peripheral 100 (the image reading device 1). For example, the main switch 9s is a mechanical switch. By actuating the main switch 9s, a user can perform an ON/OFF operation of the main power. For example, the main switch 9s is installed on the side surface of the multi-functional peripheral 100. For example, if the main switch 9s is turned on, electric power is supplied to the power supply device 9. If the main switch 9s is turned off, the supply of electric power to the power supply device 9 is interrupted.

As described above, if the manuscript size detection is finished, the manuscript sensor 14 of the image reading device of the present embodiment waits in the first reference position P1 or the second reference position P2 in preparation for the next manuscript size detection. However, the supply of electric power to the multi-functional peripheral 100 and the image reading device 1 may sometimes be interrupted during the manuscript size detection (during the movement of the manuscript sensor 14) due to the power outage or the removal of a power cord. Thus, it is sometimes the case that, during the activation of main power, the manuscript sensor 14 does not exist in the first reference position P1.

In the image reading device 1 of the present embodiment, upon activating the main power, the reading control unit 10 performs a process for setting the manuscript sensor 14 in the first reference position P1. More specifically, If the main power of the image reading device 1 is activated by the main switch 9s, the moving mechanism 15 moves the manuscript sensor 14 toward the terminus portion 18 existing at the side of the first reference position P1. Upon recognizing that an output waveform having a specific pattern is outputted from the manuscript sensor 14, the reading control unit 10 reverses the moving direction of the manuscript sensor 14 and stops the manuscript sensor 14 in the first reference position P1. One example of the position control of the manuscript sensor 14 during the activation of main power will be described with reference to FIG. 16.

The "START" shown in FIG. 16 refers to the time point at which the main power of the multi-functional peripheral 100 (the image reading device 1) is activated by the main switch 9s, at which the supply of electric power to the reading control unit 10 is started and at which the startup of the CPU 10a and the storage unit 10b of the reading control unit 10 are finished.

The reading control unit 10 operates the manuscript sensor 14 (step #11). Then, the reading control unit 10 rotates the motor 153 and converts the second electromagnetic clutch 156 into a connected state. Thus, the manuscript sensor 14 is moved toward the terminus portion 18 at the side of the first reference position P1 by the manuscript sensor moving mechanism 152 (step #12). Then, the reading control unit 10 determines whether the manuscript sensor 14 has reached the terminus portion 18 (whether an output waveform having a specific pattern is outputted from the manuscript sensor 14), based on the output of the manuscript sensor 14 (step #13). If the manuscript sensor 14 has not reached the terminus portion 18 (if No in step #13), the flow returns to step #12.

On the other hand, if the manuscript sensor 14 has reached the terminus portion 18 (if Yes in step #13), the reading control unit 10 rotates the motor 153 in the reverse direction, moves the manuscript sensor 14 toward the second reference position P2 by a predetermined distance and stops the manuscript sensor 14 in the first reference position P1 (step #14).

The reading control unit 10 counts clock signals from the movement start time and moves the manuscript sensor 14 from the first reference position P1 toward the second reference position P2 (step #15). The reading control unit 10 recognizes the number of clocks inputted to the motor 153 between the time at which the manuscript sensor 14 starts movement and the time at which the output level of the manuscript sensor 14 shows a change (step #16). Subsequently, the reading control unit 10 determines whether the manuscript sensor 14 has reached the terminus portion 18 existing at the side of the second reference position P2 (whether an output waveform having a specific pattern is outputted from the manuscript sensor 14), based on the output of the manuscript sensor 14 (step #17). If the manuscript sensor 14 has not reached the terminus portion 18 existing at the side of the second reference position P2 (if No in step #17), the flow returns to step #15.

On the other hand, if the manuscript sensor 14 has reached the terminus portion 18 existing at the side of the second reference position P2 (if Yes in step #17), the reading control unit 10 stops the manuscript sensor 14 and the motor 153 (step #18). Then, the reading control unit 10 recognizes the existence or absence of a manuscript on the contact glass 12 and, if exists, the manuscript size, based on the number of clocks inputted to the motor 153 between the time at which the manuscript sensor 14 starts movement and the time at which the output level of the manuscript sensor 14 shows a change (step #19). This is because there may be, e.g., a case where a manuscript is left on the contact glass 12 or a case where the main power of the multi-functional peripheral 100 is activated by the main switch 9s with a manuscript placed on the contact glass 12. If the manuscript sensor 14 reaches the terminus portion 18 existing at the side of the second reference position P2 without showing a significant change in the output level of the manuscript sensor 14 from the movement start time, the reading control unit 10 recognizes that a manuscript does not exist on the contact glass 12.

If a manuscript exists, the manuscript existence and the manuscript size are displayed on the display of the operation panel 2 (step #110). Step #110 may be skipped if a manuscript does not exist or if there is no need to perform Step #110.

Subsequently, the reading control unit 10 rotates the motor 153 in the reverse direction, moves the manuscript sensor 14 toward the first reference position P1 by a predetermined distance from the terminus portion 18 and stops the manuscript sensor 14 in the second reference position P2 (step #111). Then, the position control of the manuscript sensor 14 during the activation of main power is terminated (END).

(Flow of Manuscript Size Detection Process)

Figure 17:
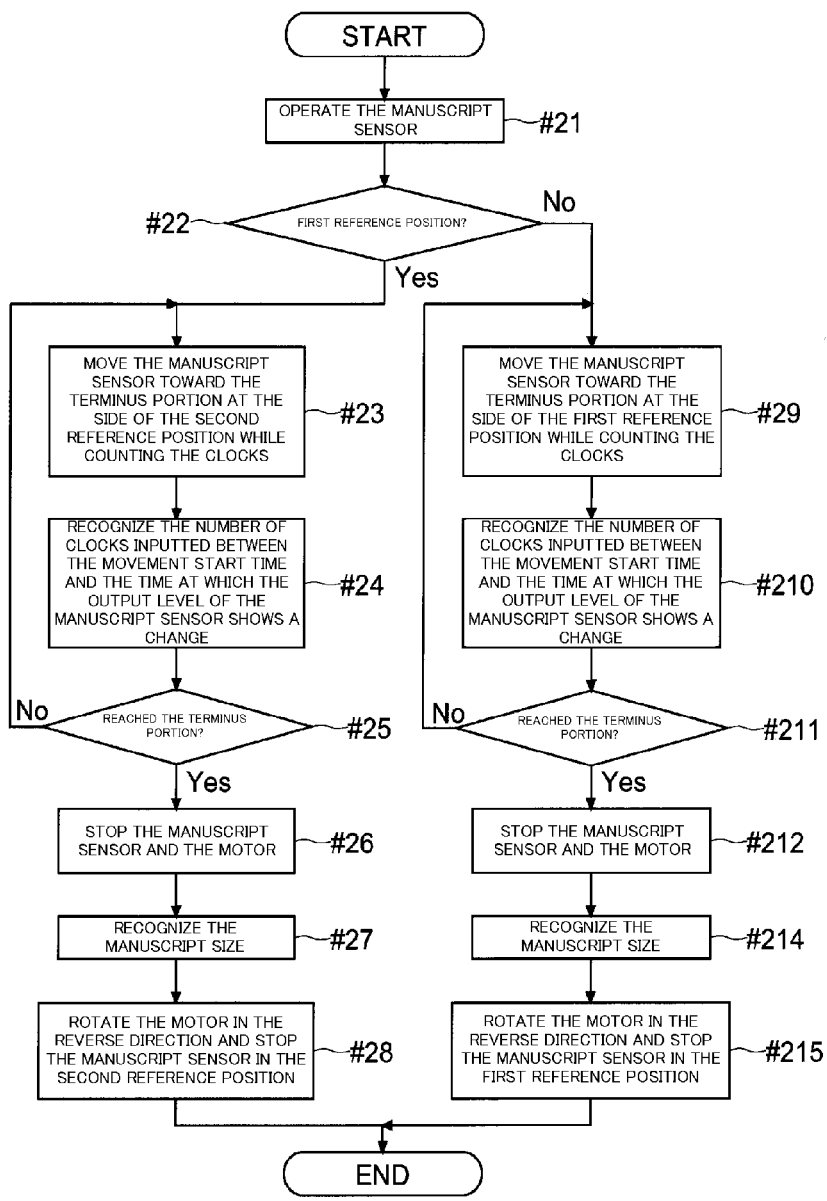
FIG. 17 is a flowchart showing one example of the flow of a manuscript size detection process.

Next, one example of the flow of a manuscript size detection process will be described with reference to FIG. 17. FIG. 17 is a flowchart showing one example of the flow of the manuscript size detection process.

The "START" shown in FIG. 17 refers to the time point at which the multi-functional peripheral 100 and the image reading device 1 are kept in a standby state and at which the manuscript size detection process is started by the generation of a trigger signal that triggers the manuscript size detection. For example, the manuscript size detection process is started by a trigger signal generated when the manuscript cover 11 is opened and then closed.

As shown in FIGS. 7 to 11, an opening/closing detection sensor 10d for detecting the opening and closing of the manuscript cover 11 is installed in the image reading device 1 of the present embodiment. For example, the opening/closing detection sensor 10d is a transmission-type photo sensor and is a sensor (switch) whose output varies depending on whether the manuscript cover 11 is closed or not. For example, as shown in FIG. 7, the opening/closing detection sensor 10d includes a movable pin biased by a spring or the like. If the manuscript cover 11 is opened, the movable pin protrudes outward. If the manuscript cover 11 is closed, the movable pin is pushed inward by making contact with the lower surface of the manuscript cover 11. For example, when pushed inward, the movable pin cuts off an optical path between a light emitting portion and a light receiving portion of the opening/closing detection sensor 10d. When protruding outward, the movable pin does not cut off the optical path between the light emitting portion and the light receiving portion. The opening/closing detection sensor 10d is not limited to the transmission-type photo sensor but may be, e.g., an interlock switch. It is only necessary that the output of the opening/closing detection sensor 10d be changed depending on the opening and closing of the manuscript cover 11.

As shown in FIG. 7, the output of the opening/closing detection sensor 10d is inputted to the reading control unit 10. Thus, the reading control unit 10 can determine whether the manuscript cover 11 is in an open state or in a closed state. Depending on the change in the output of the opening/closing detection sensor 10d, the reading control unit 10 recognizes a signal indicating the closing of the manuscript cover 11 as a trigger signal that triggers the manuscript size detection. Alternatively, the reading control unit 10 may recognize an operation of the operation panel 2 (e.g., the touch of a specific key) instructing the execution of the manuscript size detection as a trigger signal that triggers the manuscript size detection.

The reading control unit 10 operates the manuscript sensor 14 (A light emitting element is activated to apply a voltage to a light receiving element) (step #21). Then, the reading control unit 10 determines whether the manuscript sensor 14 is in the first reference position P1 (in a standby state) at the present time (step #22). If the manuscript sensor 14 exists in the first reference position P1 (if Yes in step #22), the reading control unit 10 rotates the motor 153 so that the manuscript sensor 14 can move from the first reference position P1 toward the second reference position P2 (along an outward route). While counting the number of clocks from the rotation start time (movement start time), the reading control unit 10 converts the second electromagnetic clutch 156 into a connected state, thereby rotating the pulleys 157a. Thus, the reading control unit 10 causes the moving mechanism 15 to move the manuscript sensor 14 from the first reference position P1 toward the second reference position P2 (to move the manuscript sensor 14 toward the terminus portion existing at the side of the second reference position P2) (step #23).

Then, based the output of the manuscript sensor 14, the reading control unit 10 determines whether the output level of the manuscript sensor 14 is changed or not. The reading control unit 10 recognizes the number of clocks (the count value) inputted to the motor 153 between the time at which the manuscript sensor 14 starts movement and the time at which the output level of the manuscript sensor 14 shows a change (step #24)

Next, based on the output of the manuscript sensor 14, the reading control unit 10 determines whether the manuscript sensor 14 has reached the terminus portion 18 existing at the side of the second reference position P2 (whether an output waveform having a specific pattern is outputted from the manuscript sensor 14) (step #25). If the manuscript sensor 14 has not reached the terminus portion 18 existing at the side of the second reference position P2 (if No in step #25), the flow returns to step #23.

On the other hand, if the manuscript sensor 14 has reached the terminus portion 18 existing at the side of the second reference position P2 (if Yes in step #25), the reading control unit 10 stops the manuscript sensor 14 and the motor 153 (step #26). Then, the reading control unit 10 recognizes a manuscript size based on the number of clocks inputted to the motor 153 between the time at which the manuscript sensor 14 starts movement and the time at which the output level of the manuscript sensor 14 shows a change (step #27). Subsequently, the reading control unit 10 rotates the motor 153 in the reverse direction, moves (returns) the manuscript sensor 14 toward the first reference position P1 by a predetermined distance and stops the manuscript sensor 14 in the second reference position P2 (step #28).

In the meantime, if the manuscript sensor 14 exists in the second reference position P2 (if No in step #22), the reading control unit 10 rotates the motor 153 so that the manuscript sensor 14 can move from the second reference position P2 toward the first reference position P1 (along a homeward route). While counting the number of clocks from the rotation start time (movement start time), the reading control unit 10 converts the second electromagnetic clutch 156 into a connected stat, thereby rotating the pulleys 157a. Thus, the reading control unit 10 causes the moving mechanism 15 to move the manuscript sensor 14 from the second reference position P2 toward the first reference position P1 (to move the manuscript sensor 14 toward the terminus portion existing at the side of the first reference position P1) (step #29).

Then, based the output of the manuscript sensor 14, the reading control unit 10 determines whether the output level of the manuscript sensor 14 is changed or not. The reading control unit 10 recognizes the number of clocks inputted to the motor 153 between the time at which the manuscript sensor 14 starts movement and the time at which the output level of the manuscript sensor 14 shows a change (step #210)

Next, based on the output of the manuscript sensor 14, the reading control unit 10 determines whether the manuscript sensor 14 has reached the terminus portion 18 existing at the side of the first reference position P1 (whether an output waveform having a specific pattern is outputted from the manuscript sensor 14) (step #211. If the manuscript sensor 14 has not reached the terminus portion 18 existing at the side of the first reference position P1 (if No in step #211), the flow returns to step #29.

On the other hand, if the manuscript sensor 14 has reached the terminus portion 18 existing at the side of the first reference position P1 (if Yes in step #211), the reading control unit 10 stops the manuscript sensor 14 and the motor 153 (step #212). Then, the reading control unit 10 recognizes a manuscript size based on the number of clocks inputted to the motor 153 between the time at which the manuscript sensor 14 starts movement and the time at which the output level of the manuscript sensor 14 shows a change (step #214). Subsequently, the reading control unit 10 rotates the motor 153 in the reverse direction, moves the manuscript sensor 14 toward the second reference position P2 by a predetermined distance and stops the manuscript sensor 14 in the first reference position P1 (step #215). The present flow is terminated in step #28 and step #215 (END).

(Reading of Manuscript Based on the Detected Manuscript Size)

Figure 18:
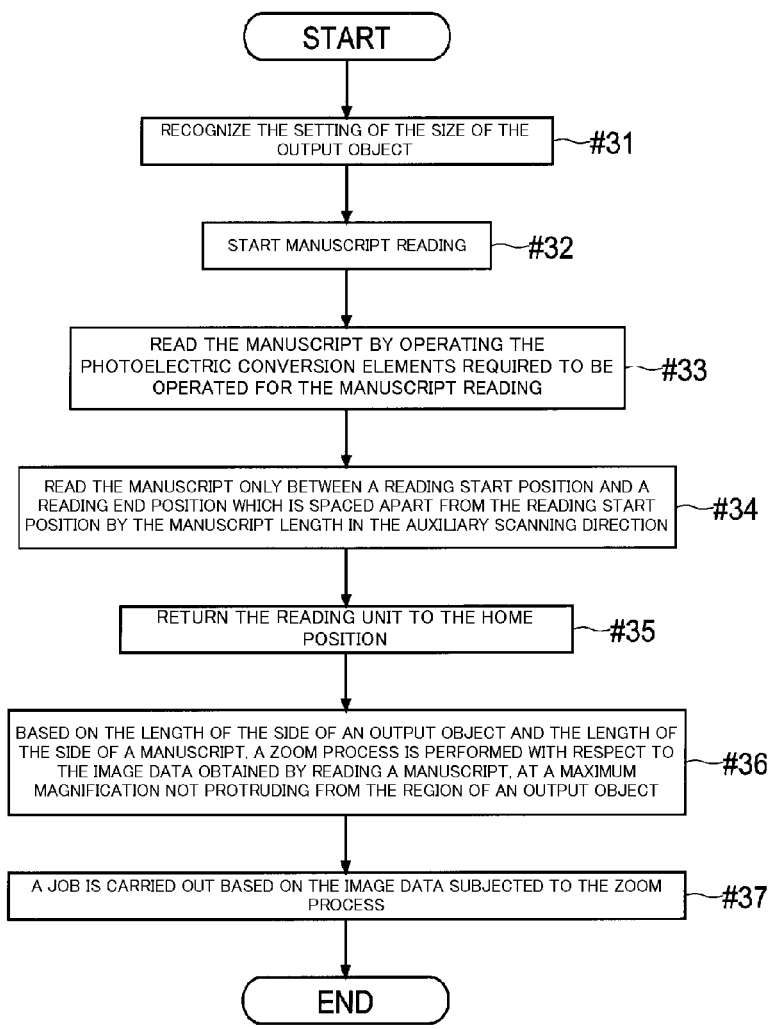
FIG. 18 is a flowchart showing one example of the manuscript reading flow based on a detected manuscript size.
Figure 19:
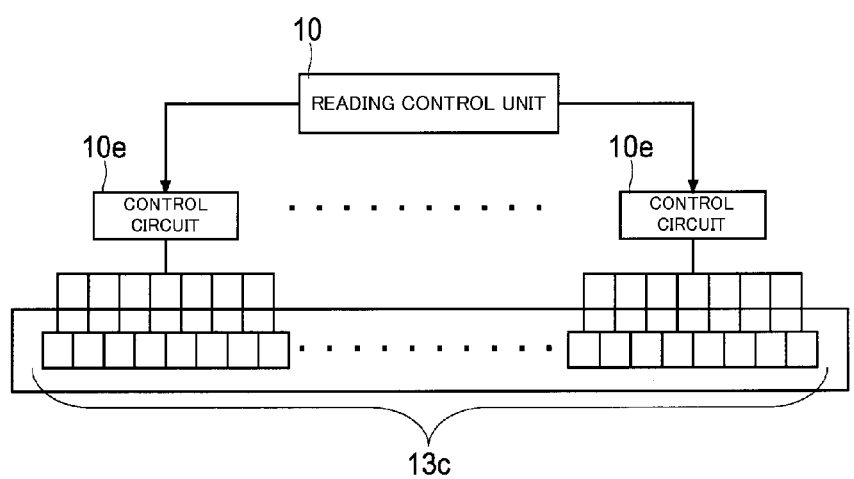
FIG. 19 is an explanatory view showing one example of a configuration of an image sensor.

Next, one example of a manuscript reading flow based on the detected manuscript size will be described with reference to FIGS. 18 and 19. FIG. 18 is a flowchart showing one example of the manuscript reading flow based on the detected manuscript size. FIG. 19 is an explanatory view showing one example of the configuration of the image sensor 13a. In the following description, there will be illustrated by way of example a process (a zoom process) in which the image data obtained by manuscript reading are automatically enlarged and reduced in conformity with the pre-set size of an output medium and a manuscript.

The "START" shown in FIG. 18 refers to the time point at which an instruction to perform a job involving manuscript reading (e.g., a copying, scanning or facsimile transmitting job) is issued by inputting the instruction to the operation panel 2 or the like. At this time, the manuscript size detection process has already been performed in the image reading device 1.

First, the reading control unit 10 recognizes the setting of a size of an output medium used in a job, based on the image data obtained using the reading unit 13 (the image sensor 13a) (step #31). In this regard, the size of the output medium means the size of a printed matter (paper) in case of a copying job, the size of outputted image data in case of a scanning job, and the size of transmitted image data in case of a facsimile transmitting job. For example, as the size of the output medium, the operation panel 2 may receive an input by which to select different kinds of regular sizes such as a letter size and an A4 size or may receive an input by which to set an irregular size (an arbitrary size).

Subsequently, the reading control unit 10 causes the reading unit 13 (the image sensor 13a) to start manuscript reading (step #32). More specifically, the reading control unit 10 operates the motor 153, converts the first electromagnetic clutch 155 into a connected state, and moves the reading unit 13 away from the home position in the sub scanning direction (toward the right side of the image reading device 1).

During the manuscript reading, the reading control unit 10 causes the image sensor 13a to read a manuscript by ensuring that, among the photoelectric conversion elements 13c of the image sensor 13a arranged side by side along the main scanning direction, the photoelectric conversion elements 13c other than the photoelectric conversion elements 13c required to be operated for the manuscript reading are not operated (step #33).

As shown in FIG. 19, the image sensor 13a of the image reading device 1 of the present embodiment includes a plurality of photoelectric conversion elements 13c (light receiving elements) arranged side by side. A control circuit 10e for performing ON/OFF operations of the photoelectric conversion elements 13c on a block-by-block basis is installed in the image reading device 1. The reading control unit 10 gives instructions to the control circuit 10e, thereby instructing the control circuit 10e to perform ON/OFF operations of the photoelectric conversion elements 13c. Thus, the ON/OFF operations of the photoelectric conversion elements 13c can be switched on a block-by-block basis.

When reading a manuscript, the reading control unit 10 does not operate the photoelectric conversion elements 13c other than the photoelectric conversion elements 13c necessary to be operated for the manuscript reading. More specifically, based on the manuscript size in the main scanning direction detected by the manuscript size detection, the reading control unit 10 operates only the block of the photoelectric conversion elements 13c necessary to read a manuscript (only the block of the photoelectric conversion elements 13c above which a manuscript exists) and does not operate the unnecessary block of the photoelectric conversion elements 13c (the block of the photoelectric conversion elements 13c above which a manuscript does not exist).

Alternatively, the control circuit 10e may perform the ON/OFF operations of the photoelectric conversion elements 13c not on a block basis but on a one-by-one basis. Depending on the detected manuscript length in the main scanning direction, the reading control unit 10 may operate only the photoelectric conversion elements 13c necessary to read a manuscript (only the photoelectric conversion elements 13c above which a manuscript exists) and may not operate the unnecessary photoelectric conversion elements 13c (the photoelectric conversion elements 13c above which a manuscript does not exist). In other words, the ON/OFF operations of the photoelectric conversion elements 13c may be controlled not on a block basis but on a basis of individual photoelectric conversion elements 13c.

In the sub scanning direction, the reading control unit causes the reading unit 13 (the image sensor 13a) to perform manuscript reading only between a reading start position and a reading end position which is spaced apart from the reading start position by the recognized (detected) manuscript length in the sub scanning direction (step #34). In this regard, the reading start position is the left edge of the contact glass 12. The reading end position is the right side (edge) of a manuscript.

If the manuscript reading only between the reading start position and the reading end position is finished, the reading control unit 10 returns the reading unit 13 to the home position (step #35). More specifically, the reading control unit 10 rotates the motor 153 in the reverse direction and moves the reading unit 13 in a direction opposite to the moving direction of the reading unit 13 during the manuscript reading, until the home position detecting sensor 10c can detect the reading unit 13 positioned in the home position. In the image reading device 1 of the present embodiment, the manuscript length in the sub scanning direction can be accurately recognized. It is therefore possible to minimize the displacement of the reading unit 13 in the sub scanning direction and to increase the reading speed.

Based on the length of the side of an output medium and the length of the side of a manuscript recognized (detected) by the reading control unit 10, the image processing unit 8 or 16 performs a zoom process (automatic magnification changing process) with respect to the image data obtained by reading a manuscript, at a maximum magnification not protruding from the region of an output medium (step #36). The automatic zoom process (automatic magnification changing process) may be performed by the image processing unit 16 installed in the image reading device 1 or by the image processing unit 8 arranged within the main body. In case where the automatic zoom process (automatic magnification changing process) is performed by the image processing unit 8, the image processing unit 8 serves as the image processing unit of the image reading device 1. In FIG. 7, there is shown an example in which zoom processing units 8a and 16d as circuits for performing the zoom process are installed in the image processing unit 8 and the image processing unit 16.

In a certain typical image reading device, during an automatic zoom process (automatic magnification changing process), the enlargement or reduction of the image data is performed at any suitable magnification in order to change the size of the image data from a certain regular size to another regular size (e.g., from a letter size to a statement size or from an A4 size to an A3 size). However, the size of a manuscript is not limited to a regular size but may sometimes be an irregular size. For that reason, when reading a manuscript of irregular size and performing an automatic zoom process, a magnification suitable for enlargement or reduction from a certain regular size to another regular size is used. Thus, an optimal magnification is not used in obtaining an output medium based on a manuscript of irregular size.

However, in the multi-functional peripheral 100 or the image reading device 1 of the present embodiment, the manuscript length in the main scanning direction and the manuscript length in the sub scanning direction are accurately recognized (manuscript size detection), regardless of whether a manuscript has a regular size or an irregular size. Thus, an automatic zoom process can be performed at an optimal magnification that does not leave an unnecessary margin in the output medium nor allow a portion of the manuscript to protrude from the output medium.

More specifically, for example, the image processing unit 8 or 16 finds a ratio of the detected length of the side of the manuscript parallel to the main scanning direction to the length of the side of the output medium parallel to the main scanning direction. Furthermore, the image processing unit 8 or 16 finds a ratio of the detected length of the side of the manuscript parallel to the sub scanning direction to the length of the side of the output medium parallel to the sub scanning direction. The smaller one of the ratios thus found becomes an optimal magnification that does not protrude from the region of the output medium.

Data indicating the lengths in the sub scanning direction of the sides of different kinds of papers of regular size and the lengths of the sides thereof in the main scanning direction may be stored in the storage unit 10b. By referring to the data stored in the storage unit 10b, the image processing unit 8 or 16 may recognize the lengths of the respective sides of the output medium having a size designated by the operation panel 2. Alternatively, the image processing unit 8 or 16 may recognize the lengths of the respective sides of the output medium based on the size of the output medium designated by the operation panel 2. In addition, the reading control unit 10 may find a ratio of the sides parallel to the main scanning direction or a ratio of sides parallel to the sub scanning direction and then may perform calculation for fining an optimal magnification.

Then, a job is carried out based on the image data subjected to the zoom process (step #37). Thereafter, the present flow is terminated (end).

As described above, the image reading device 1 of the present embodiment includes: a contact glass 12 on which a manuscript as a reading target is placed; a reading unit 13 provided with an image sensor 13a and configured to read the manuscript placed on the contact glass 12; a manuscript sensor whose output level varies depending on whether the existence of the manuscript is detected or not; a moving mechanism 15 configured to move the manuscript sensor 14 from a predetermined reference position (a first reference position P1 or a second reference position P2) in an oblique direction with respect to a main scanning direction and an sub scanning direction such that a detection zone of the manuscript sensor passes through a side of the manuscript placed on the contact glass 12, which is parallel to the sub scanning direction (e.g., a lower side of the manuscript when a back side of the image reading device 1 is assumed to be upward) and a side of the manuscript parallel to the main scanning direction (e.g., a side of the manuscript distant from a manuscript placing reference point P0, namely a right side of the manuscript when a back side of the image reading device 1 is assumed to be upward); and a recognizing unit (a reading control unit 10) configured to, when performing manuscript size detection, recognize a length in the main scanning direction of the manuscript placed on the contact glass 12 and a length in the sub scanning direction of the manuscript placed on the contact glass 12, based on a displacement of the manuscript sensor 14 from the reference position at the time when the output level of the manuscript sensor 14 shows a change. Thus, based on the displacements of the manuscript sensor 14 (the displacement in the main scanning direction and the displacement in the sub scanning direction) and regardless of whether the manuscript has a regular size or an irregular size, it is possible to rapidly and accurately detect the manuscript length in the main scanning direction and the manuscript length in the sub scanning direction. There is no need to install a plurality of sensors in order to find the manuscript length in the main scanning direction and the manuscript length in the sub scanning direction. It is therefore possible to reduce manufacturing costs and wiring lines.

As mentioned earlier, there is proposed an image forming device which includes a manuscript stand on which at least one side of a manuscript is paced according to a manuscript placing standard, a detection position set in a specified position deviated from the manuscript placing standard in order to detect a size of the manuscript, a detecting means for detecting the manuscript in the detection position, a size specifying means for specifying the size of the manuscript placed on the manuscript stand, based on a detection state of the manuscript in the detection position, and a moving means for moving the detecting means to a specified detection position. The size specifying means specifies the size of the manuscript placed on the manuscript stand, based on the detection state of the manuscript in the specified detection position detected by the moving detecting means.

In a certain image reading device, manuscript size detection is performed. For example, a plurality of sensors (e.g., reflection-type photo sensors) is installed along a main scanning direction or a sub scanning direction. The edge of a paper is deemed to exist between a sensor which detects the existence of a manuscript and a sensor which does not detect the existence of a manuscript. Thus, it is possible to find the approximate lengths of the manuscript in the main scanning direction and the sub scanning direction. For example, the kind of a paper having a most likely regular size is decided based on the detected sides and approximate lengths of the manuscript.

It is sometimes the case that the length of a manuscript in a main scanning direction is detected by reading only the manuscript end portions with an image sensor when a manuscript pressing member is moved down and counting the number of dots existing between the manuscript edges based on the image data obtained by reading.

The results of manuscript size detection are used in determining whether to perform copying with a paper held in an image forming device, selecting a paper, or automatically setting a magnification through calculation in an image data zoom process.

However, the manuscript size read by an image reading device is not limited to a regular paper size but may sometimes be an irregular size. For example, a document whose margin is partially cut away for documentation has an irregular size. In a certain typical image reading device, the detected length of a side of a manuscript is an approximate length. Therefore, when copying a manuscript of irregular size at an automatic magnification, there may be a case where the content of a manuscript is copied with a size smaller than a desired size and is not included in a printed matter it its entirety (with a portion protruding from the printed matter). For that reason, during manuscript size detection, it is desirable to accurately detect not only the manuscript length in the main scanning direction but also the manuscript length in the sub scanning direction.

In the image forming device proposed as above, a sensor unit for detecting a manuscript is installed in a zoom lens unit. Manuscript size detection is performed by moving the zoom lens unit. In this technology, however, a plurality of (e.g., at least three) photo sensors each formed by combining a light emitting element and a light receiving element is installed. This leads to an increase in the number of sensors installed. This technology detects the regular size of a manuscript by moving the zoom lens unit and cannot accurately detect the lengths of the respective sides of a manuscript having an irregular size. There is a limit in the moving range of the zoom lens unit. The limitation in the moving range significantly limits the manuscripts whose size can be detected. Thus, this technology is still problematic in terms of accurate detection of a manuscript size. It is important to stop the zoom lens unit in an exact position. The zoom lens unit is not well prepared for high-speed movement. This poses a problem in that time is required from the start of manuscript size detection to the end of manuscript size detection.

According to the embodiment of the present disclosure, as described above, it is possible to cost-effectively, rapidly and accurately detect the size of a manuscript, including the manuscript length in the main scanning direction and the manuscript length in the sub scanning direction.

The moving mechanism 15 includes: a single motor 153; a reading unit moving mechanism 151 including a first clutch (a first electromagnetic clutch 155 for, e.g., interrupting the drive force at the end of movement of the reading unit 13) configured to transmit a drive force for moving the reading unit 13 in the sub scanning direction, configured to move the reading unit 13 by transmitting the drive force from the motor 153 to the reading unit 13 when moving the reading unit 13, and configured to perform transmission and interruption of the drive force supplied from the motor 153; and a manuscript sensor moving mechanism 152 including a second clutch (a second electromagnetic clutch 156 for, e.g., interrupting the drive force at the end of movement of the manuscript sensor 14) configured to transmit a drive force for moving the manuscript sensor 14, configured to move the manuscript sensor 14 by transmitting the drive force from the motor 153 to the manuscript sensor 14 when moving the manuscript sensor 14, and configured to perform transmission and interruption of the drive force supplied from the motor 153. According to this configuration, the drive force transmitted from the motor 153 to the reading unit 13 through the first electromagnetic clutch 155 is interrupted when moving the manuscript sensor 14. The drive force transmitted from the motor 153 to the manuscript sensor 14 through the second electromagnetic clutch 156 is interrupted when moving the reading unit 13. Thus, the manuscript sensor 14 and the reading unit 13 can be independently moved by a single motor 153 without having to install a plurality of motors 153. Accordingly, it is possible to reduce the device manufacturing costs and to effectively utilize the member (the motor 153).

The image reading device 1 includes: an output setting unit (an operation panel 2) configured to set a size of an output medium based on image data obtained using the reading unit 13; and an image processing unit (an image processing unit 8 or 16) configured to perform enlargement and reduction of the image data obtained using the reading unit 13, at a maximum magnification not protruding from a region of the output medium, based on a ratio of a length of a side of the output medium to a length of a side of the manuscript recognized by the recognizing unit (the reading control unit 10). Thus, even if the manuscript has an irregular size, the magnification in the zoom process can be automatically set to a suitable magnification with no possibility that the read content becomes smaller than a desired size in the output medium such as a printed matter or the like or that the read content protrudes from the output medium. Accordingly, even if the manuscript has an irregular size, there is no need to manually find a suitable magnification. This makes it possible to enhance the ease of use of the image reading device 1.

In the image reading device 1, a terminus portion 18 which enables the manuscript sensor 14 to, upon reading the terminus portion 18, output an output waveform having a specific pattern is installed in an end section of a moving range of the manuscript sensor 14, the moving mechanism 15 configured to stop movement of the manuscript sensor 14 toward the end section of the moving range if the recognizing unit (the reading control unit 10) recognizes that the output waveform having a specific pattern is outputted from the manuscript sensor 14. Thus, it is possible to appropriately stop the manuscript sensor 14 without continuously moving the manuscript sensor 14 beyond the end of the moving range. This makes it possible to prevent the motor 153 from being locked.

The reference position (the first reference position P1 or the second reference position P2) is set more inward than the terminus portion 18 by a predetermined distance, the moving mechanism 15 configured to reverse a moving direction of the manuscript sensor 14 and stop the manuscript sensor 14 in the reference position if the recognizing unit (the reading control unit 10) recognizes that the output waveform having a specific pattern is outputted from the manuscript sensor 14. Thus, the manuscript sensor 14 is stopped in the reference position upon detecting the terminus portion 18 after the manuscript sensor 14 is moved from one end of the moving range toward the other end thereof to detect a manuscript size and after the manuscript size is recognized. Accordingly, the manuscript sensor 14 waits in the reference position during the time period between one manuscript size detection and another manuscript size detection. When performing manuscript size detection, the manuscript sensor 14 can be directly moved from the reference position. This makes it possible to shorten the time required for the manuscript size detection.

Due to the power outage or the removal of a power cord during the manuscript size detection (during the movement of the manuscript sensor 14), the main power of the image reading device 1 may be cut off when the manuscript sensor 14 does not exist in the reference position (the first reference position P1 or the second reference position P2). In view of this, the image reading device 1 further includes: a main switch 9s configured to perform activation and deactivation of the main power of the image reading device 1, the moving mechanism 15 configured to, upon activating the main power of the image reading device 1 with the main switch 9s, move the manuscript sensor 14 toward the terminus portion 18 and configured to reverse a moving direction of the manuscript sensor 14 and stop the manuscript sensor 14 in the reference position if the recognizing unit (the reading control unit 10) recognizes that the output waveform having a specific pattern is outputted from the manuscript sensor 14. Thus, the manuscript sensor 14 is caused to wait in the reference position immediately after activation of the main power. Accordingly, regardless of the position of the manuscript sensor 14 at the time when the main power of the image reading device 1 is previously cut off, the manuscript sensor 14 can be aligned with the reference position as soon as the main power is activated. This makes it possible to rapidly bring the manuscript sensor 14 into a state ready for manuscript size detection.

Terminus portions 18 for enabling the manuscript sensor 14 to, upon reading the terminus portions, output an output waveform having a specific pattern are installed at opposite end sections of a moving range of the manuscript sensor 14. A first reference position P1 and a second reference position P2 as the reference position are set more inward than the terminus portions 18 by a predetermined distance. When manuscript size detection is performed in a state in which the manuscript sensor 14 exists in the first reference position P1, the moving mechanism 15 moves the manuscript sensor 14 toward the second reference position P2, the recognizing unit (the reading control unit 10) recognizes a manuscript length in the main scanning direction and a manuscript length in the sub scanning direction based on a displacement of the manuscript sensor 14 from the first reference position P1 when the manuscript sensor 14 shows a change in the output level thereof, and then the moving mechanism 15 stops the manuscript sensor 14 in the second reference position P2. When manuscript size detection is performed in a state in which the manuscript sensor 14 exists in the second reference position P2, the moving mechanism 15 moves the manuscript sensor 14 toward the first reference position P1, the recognizing unit (the reading control unit 10) recognizes a manuscript length in the main scanning direction and a manuscript length in the sub scanning direction based on a displacement of the manuscript sensor 14 from the second reference position P2 when the manuscript sensor 14 shows a change in the output level thereof, and then the moving mechanism 15 stops the manuscript sensor 14 in the first reference position P1. Thus, when performing manuscript size detection, it is possible to rapidly recognize the manuscript size by merely causing the manuscript sensor 14 to make one way movement from one end of the moving range toward the other end thereof.

The reading unit 13 is configured to perform manuscript reading only between a reading start position and a reading end position which is spaced apart from the reading start position by the manuscript length in the sub scanning direction, which is recognized by the recognizing unit (the reading control unit 10). The moving mechanism 15 is configured to return the reading unit 13 to a home position after the reading unit 13 is moved from the home position to the reading end position. Thus, based on the accurately-recognized manuscript length in the sub scanning direction, the reading unit 13 can perform manuscript reading only in a necessary range. In a certain typical image reading device, when detecting an approximate manuscript length in a sub scanning direction through a manuscript size detection process, the reading unit 13 roughly performs reading even in an unnecessary region. With the above configuration, it is possible to avoid reading with respect to an unnecessary region. Since unnecessary reading is not performed, it is possible to reduce the electric power and the time required in reading a manuscript. This makes it possible to rapidly perform manuscript reading and to reduce power consumption.

The reading unit 13 includes a plurality of photoelectric conversion elements 13c arranged side by side along the main scanning direction. When reading the manuscript, the photoelectric conversion elements 13c other than the photoelectric conversion elements 13c required to be operated for the manuscript reading are not operated. This makes it possible to operate only the necessary photoelectric conversion elements 13c of the reading unit 13. Accordingly, it is possible to reduce the electric power required in reading a manuscript.

The image reading device 1 includes a manuscript pressing plate 11a configured to press the manuscript placed on the contact glass 12. The manuscript sensor 14 is a reflection-type photo sensor. A reflection suppressing portion 11c for suppressing reflection of light toward the manuscript sensor 14 is installed in the manuscript pressing plate 11a in such a position that corresponds to a moving track of the detection zone of the manuscript sensor 14 when the manuscript is pressed by the manuscript pressing plate 11a. Thus, even if the manuscript pressing plate 11a is in a closed state, it is possible to reliably change the output level of the manuscript sensor 14 when the manuscript sensor 14 passes through the side of the manuscript parallel to the sub scanning direction and the side of the manuscript parallel to the main scanning direction. Accordingly, it is possible to enhance the manuscript size detection accuracy.

The image forming device (the multi-functional peripheral 100) includes the image reading device 1. The image reading device 1 can accurately detect the manuscript length in the main scanning direction and the manuscript length in the sub scanning direction. Accordingly, it is possible to provide the image forming device (the multi-functional peripheral 100) which can makes use of the accurate results of manuscript size detection. Use of the image reading device 1 which is low in manufacturing costs makes it possible to provide the image forming device (the multi-functional peripheral 100) in a cost-effective manner.

While the present embodiment has been described above, the technical scope of the present disclosure is not limited thereto. Many different modifications can be made without departing from the spirit of the technology of the present disclosure.

What is claimed is:

1. An image reading device, comprising:
 a contact glass on which a manuscript as a reading target is placed;
 a reading unit provided with an image sensor and configured to read the manuscript placed on the contact glass;
 a manuscript sensor whose output level varies depending on whether an existence of the manuscript is detected or not;
 a moving mechanism configured to move the manuscript sensor linearly from a predetermined reference position in an oblique direction with respect to a main scanning direction and a sub scanning direction such that a detection zone of the manuscript sensor passes through a side of the manuscript placed on the contact glass that is parallel to the sub scanning direction and a side of the manuscript that is parallel to the main scanning direction; and
 a recognizing unit configured to, when performing manuscript size detection, recognize a manuscript length in the main scanning direction and a manuscript length in the sub scanning direction of the manuscript placed on the contact glass, based on an amount of a displacement of the manuscript sensor from the reference position at a time when the output level of the manuscript sensor shows a change.

2. The image reading device of claim 1, wherein the moving mechanism comprises:
 a single motor;
 a reading unit moving mechanism including a first clutch configured to transmit a drive force for moving the reading unit in the sub scanning direction, configured to move the reading unit by transmitting the drive force from the motor to the reading unit when moving the reading unit, and configured to perform transmission and interruption of the drive force supplied from the motor; and
 a manuscript sensor moving mechanism including a second clutch configured to transmit a drive force for moving the manuscript sensor, configured to move the manuscript sensor by transmitting the drive force from the motor to the manuscript sensor when moving the manuscript sensor, and configured to perform transmission and interruption of the drive force supplied from the motor.

3. The image reading device of claim 1, further comprising:
 an output setting unit configured to set a size of an output medium based on image data obtained using the reading unit; and
 an image processing unit configured to perform enlargement and reduction of the image data obtained using the reading unit, at a maximum magnification not protruding from a region of the output medium, based on a ratio of a length of a side of the output medium to a length of a side of the manuscript recognized by the recognizing unit.

4. The image reading device of claim 1, wherein a terminus portion which enables the manuscript sensor to, upon reading the terminus portion, output an output waveform having a specific pattern is installed in an end section of a moving range of the manuscript sensor, the moving mechanism configured to stop movement of the manuscript sensor toward the end section of the moving range if the recognizing unit recognizes that the output waveform having the specific pattern is outputted from the manuscript sensor.

5. The image reading device of claim 4, wherein the reference position is set more inward than the terminus portion by a predetermined distance, the moving mechanism configured to reverse a moving direction of the manuscript sensor and stop the manuscript sensor in the reference position if the recognizing unit recognizes that the output waveform having the specific pattern is outputted from the manuscript sensor.

6. The image reading device of claim 4, further comprising:
 a main switch configured to perform activation and deactivation of a main power of the image reading device,
 wherein the moving mechanism is configured to, upon activation of the main power of the image reading device with the main switch, move the manuscript sensor toward the terminus portion and is configured to reverse a moving direction of the manuscript sensor and stop the manuscript sensor in the reference position if the recognizing unit recognizes that the output waveform having the specific pattern is outputted from the manuscript sensor.

7. The image reading device of claim 1, wherein terminus portions for enabling the manuscript sensor to, upon reading the terminus portions, output an output waveform having a specific pattern are installed at opposite end sections of a moving range of the manuscript sensor;
 wherein a first reference position and a second reference position as the reference position are set more inward than the terminus portions by a predetermined distance;
 wherein, when the manuscript size detection is performed in a state in which the manuscript sensor exists in the first reference position, the moving mechanism moves the manuscript sensor toward the second reference position, the recognizing unit recognizes the manuscript length in the main scanning direction and the manuscript length in the sub scanning direction based on a displacement of the manuscript sensor from the first reference position when the manuscript sensor shows a change in the output level thereof, and then the moving mechanism stops the manuscript sensor in the second reference position; and
 wherein, when the manuscript size detection is performed in a state in which the manuscript sensor exists in the second reference position, the moving mechanism moves the manuscript sensor toward the first reference position, the recognizing unit recognizes the manuscript length in the main scanning direction and the manuscript length in the sub scanning direction based on a displacement of the manuscript sensor from the second reference position when the manuscript sensor shows a change in the output level thereof, and then the moving mechanism stops the manuscript sensor in the first reference position.

8. The image reading device of claim 1, wherein the reading unit is configured to perform manuscript reading only between a reading start position and a reading end position which is spaced apart from the reading start position by the manuscript length in the sub scanning direction, which is recognized by the recognizing unit; and
 wherein the moving mechanism is configured to return the reading unit to a home position after the reading unit is moved from the home position to the reading end position.

9. The image reading device of claim 1, wherein the reading unit comprises a plurality of photoelectric conversion elements arranged side by side along the main scanning direction; and wherein, when reading the manuscript, the photoelectric conversion elements other than the photoelectric conversion elements required to be operated for the manuscript reading are not operated.

10. The image reading device of claim 1, further comprising:

a manuscript pressing plate configured to press the manuscript placed on the contact glass, wherein the manuscript sensor is a reflection-type photo sensor, and a reflection suppressing portion for suppressing reflection of light toward the manuscript sensor is installed in the manuscript pressing plate in such a position that corresponds to a moving track of the detection zone of the manuscript sensor when the manuscript is pressed by the manuscript pressing plate.

11. An image forming device, comprising the image reading device of claim 1.

* * * * *